United States Patent
Kuklinski et al.

(10) Patent No.: US 10,354,472 B2
(45) Date of Patent: Jul. 16, 2019

(54) SELF-LEARNING SYSTEM AND METHODS FOR AUTOMATIC DOCUMENT RECOGNITION, AUTHENTICATION, AND INFORMATION EXTRACTION

(71) Applicant: FACEBOOK, INC., Menlo Park, CA (US)

(72) Inventors: Theodore Kuklinski, West Newton, MA (US); Bruce Monk, Bedford, NH (US)

(73) Assignee: Facebook, Inc., Menlo Park, CA (US)

( * ) Notice: Subject to any disclaimer, the term of this patent is extended or adjusted under 35 U.S.C. 154(b) by 274 days.

(21) Appl. No.: 15/319,441

(22) PCT Filed: Jun. 19, 2015

(86) PCT No.: PCT/US2015/036714
§ 371 (c)(1),
(2) Date: Dec. 16, 2016

(87) PCT Pub. No.: WO2015/196084
PCT Pub. Date: Dec. 23, 2015

(65) Prior Publication Data
US 2017/0132866 A1   May 11, 2017

Related U.S. Application Data

(60) Provisional application No. 62/014,775, filed on Jun. 20, 2014.

(51) Int. Cl.
*G07D 7/20* (2016.01)
*G06K 9/62* (2006.01)
(Continued)

(52) U.S. Cl.
CPC .......... *G07D 7/2083* (2013.01); *G06F 21/44* (2013.01); *G06K 9/00456* (2013.01);
(Continued)

(58) Field of Classification Search
CPC ........ G07D 7/2083; G07D 7/202; G07D 7/20; G06F 21/44; G06K 9/00; G06K 9/62;
(Continued)

(56) References Cited

U.S. PATENT DOCUMENTS

| 8,156,115 B1* | 4/2012 | Erol | G06K 9/00442 |
| | | | 707/728 |
| 2009/0076996 A1* | 3/2009 | Hull | G06K 9/00463 |
| | | | 706/46 |

(Continued)

OTHER PUBLICATIONS

Kuklinski, International Search Report and Written Opinion, PCT/US2015/036714, dated Nov. 12, 2015, 10 pgs.
Kuklinski, International Preliminary Report on Patentability, PCT/US2015/036714, dated Dec. 20, 2016, 7 pgs.

*Primary Examiner* — Jayesh M Jhaveri
(74) *Attorney, Agent, or Firm* — Morgan, Lewis & Bockius LLP

(57) ABSTRACT

A computerized system for classifying and authenticating documents is provided. The Classification process involves the creation of a Unique Pair Feature Vector which provides the best discrimination information for each pair of Document Classes at every node in a Pairwise Comparison Nodal Network. The Nodal Network has a plurality of nodes, each node corresponding to the best discrimination information between two potential document classes. By performing a pairwise comparison of the potential documents using this nodal network, the document is classified. After classification, the document can be authenticated for validity.

13 Claims, 34 Drawing Sheets

BASIC PAIRWISE COMPARATOR NODAL NETWORK

(51) Int. Cl.
 G07D 7/202 (2016.01)
 G06F 21/44 (2013.01)
 G06K 9/00 (2006.01)
 G06N 5/02 (2006.01)
 G06K 9/80 (2006.01)
 G06K 9/82 (2006.01)

(52) U.S. Cl.
 CPC ......... *G06K 9/00463* (2013.01); *G06K 9/626* (2013.01); *G07D 7/20* (2013.01); *G07D 7/202* (2017.05); *G06K 9/6267* (2013.01); *G06K 9/80* (2013.01); *G06K 9/82* (2013.01); *G06N 5/02* (2013.01)

(58) Field of Classification Search
 CPC .. G06K 9/626; G06K 9/6267; G06K 9/00456; G06K 9/00463; G06K 9/80; G06K 9/82; G06N 5/02
 See application file for complete search history.

(56) References Cited

U.S. PATENT DOCUMENTS

| | | |
|---|---|---|
| 2009/0154778 A1 | 6/2009 | Lei et al. |
| 2009/0307213 A1 | 12/2009 | Deng et al. |
| 2014/0133742 A1* | 5/2014 | Xiao .................. G06K 9/00664 382/159 |

* cited by examiner

BASIC PAIRWISE COMPARATOR NODAL NETWORK

NUMBER OF NODES REQUIRED FOR GIVEN NUMBER OF CLASSES USING ALL PAIRS VS. PCNN APPROACH

PCNN FOR SIZE PRE-CLASSIFICATION

PCNN WITHIN NODE FOR DETERMINING ORIENTATION

DOCUMENT SAMPLES SORTED BY SIZE

SAMPLE COLLECTION OF THE SAME SIZE SAMPLES SORTED BY ISSUER (NY)

EXAMPLE MULTI-MODE FEATURE VECTOR (MFV)
2 X 3 grid, 18-nodes

STATISTICAL SELECTION OF SAMPLES FOR DC

CONSISTENCY ORDERING FRs TO CREATE DC FV

TRAINING PROCESS - FEATURE EXTRACTION
Extract All Features for Every Document Class

SELECTION OF INTRA-CLASS FV PROPERTIES

SELECTION OF PROPERTIES FOR INTER-CLASS
FEATURE VECTORS (IFV)

Figure 19B
OPTIMIZATION OF IFV ILLUSTRATION
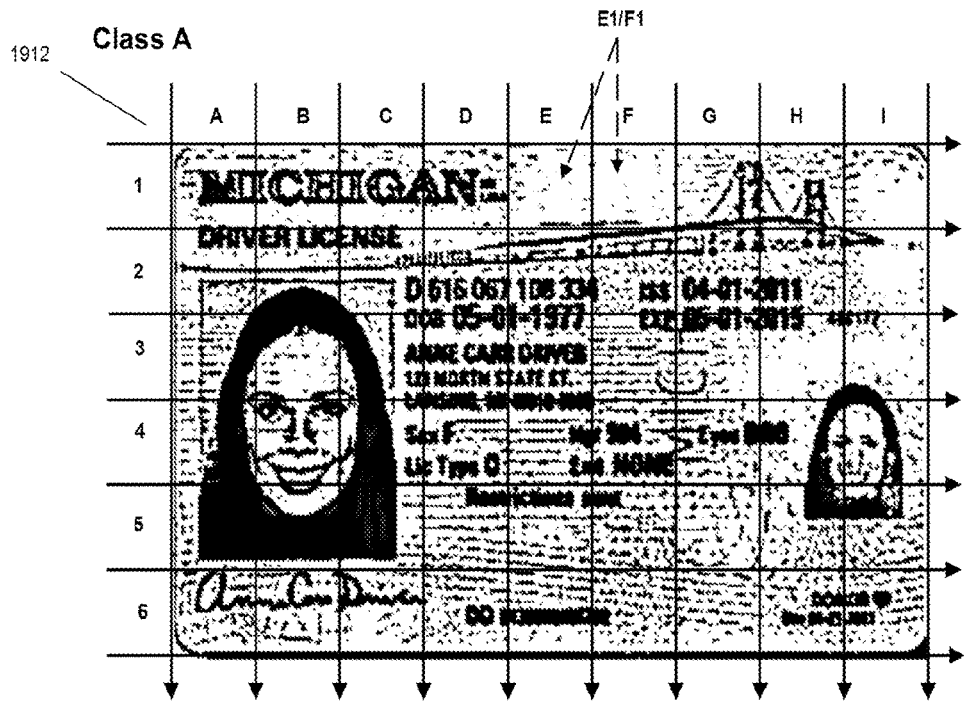
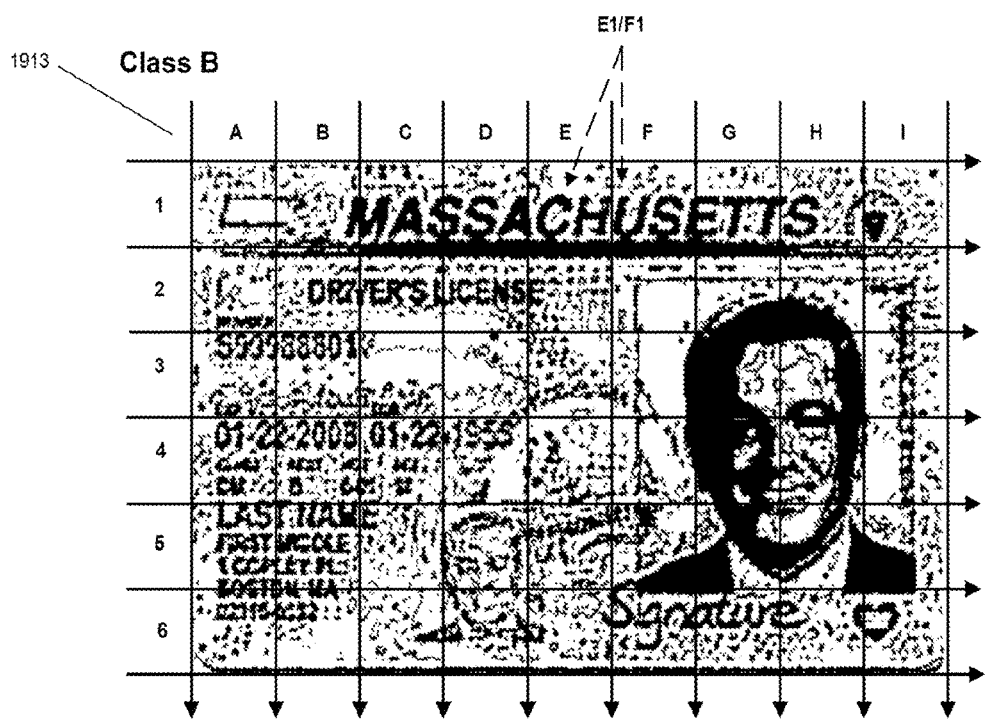

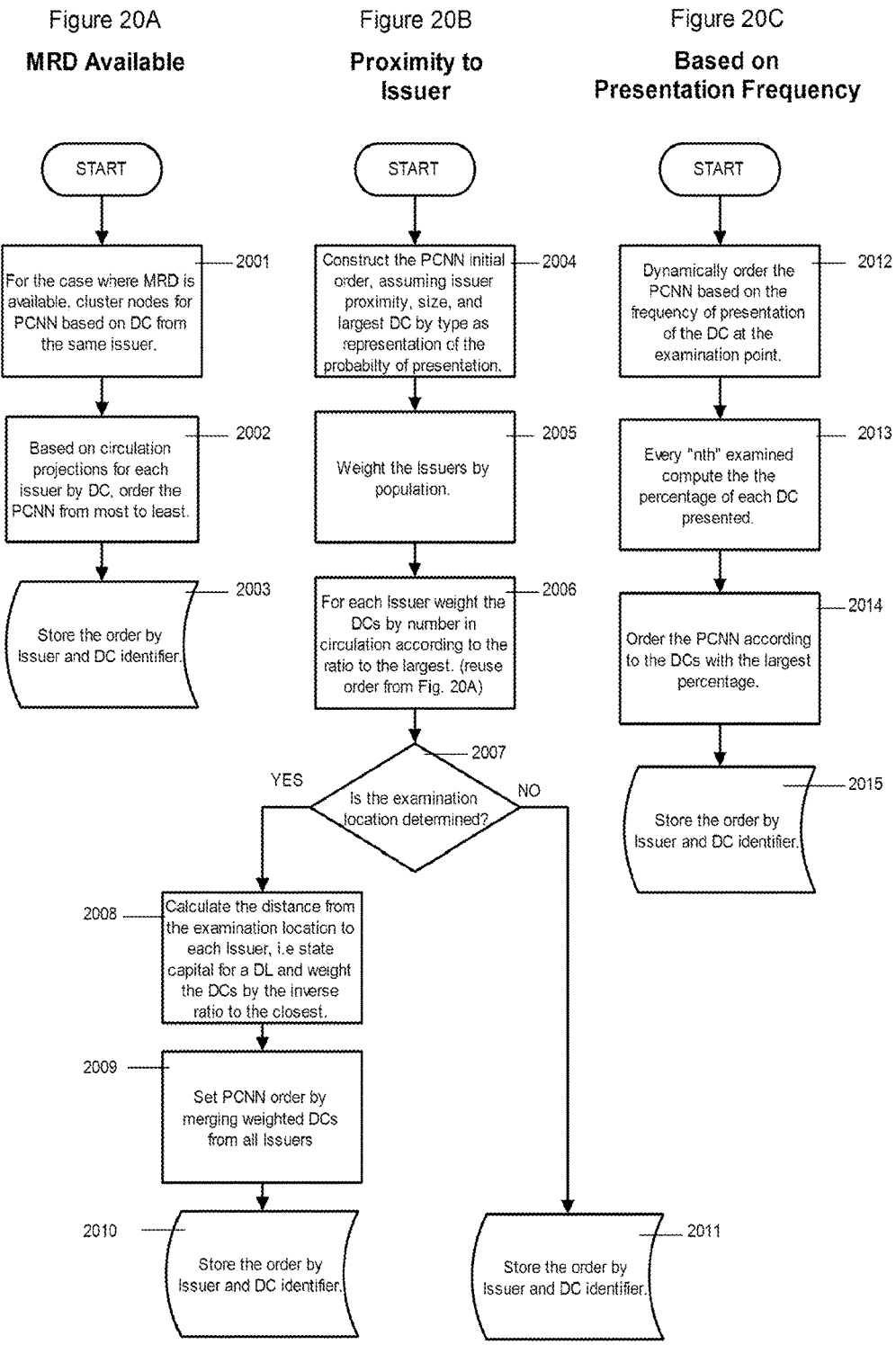

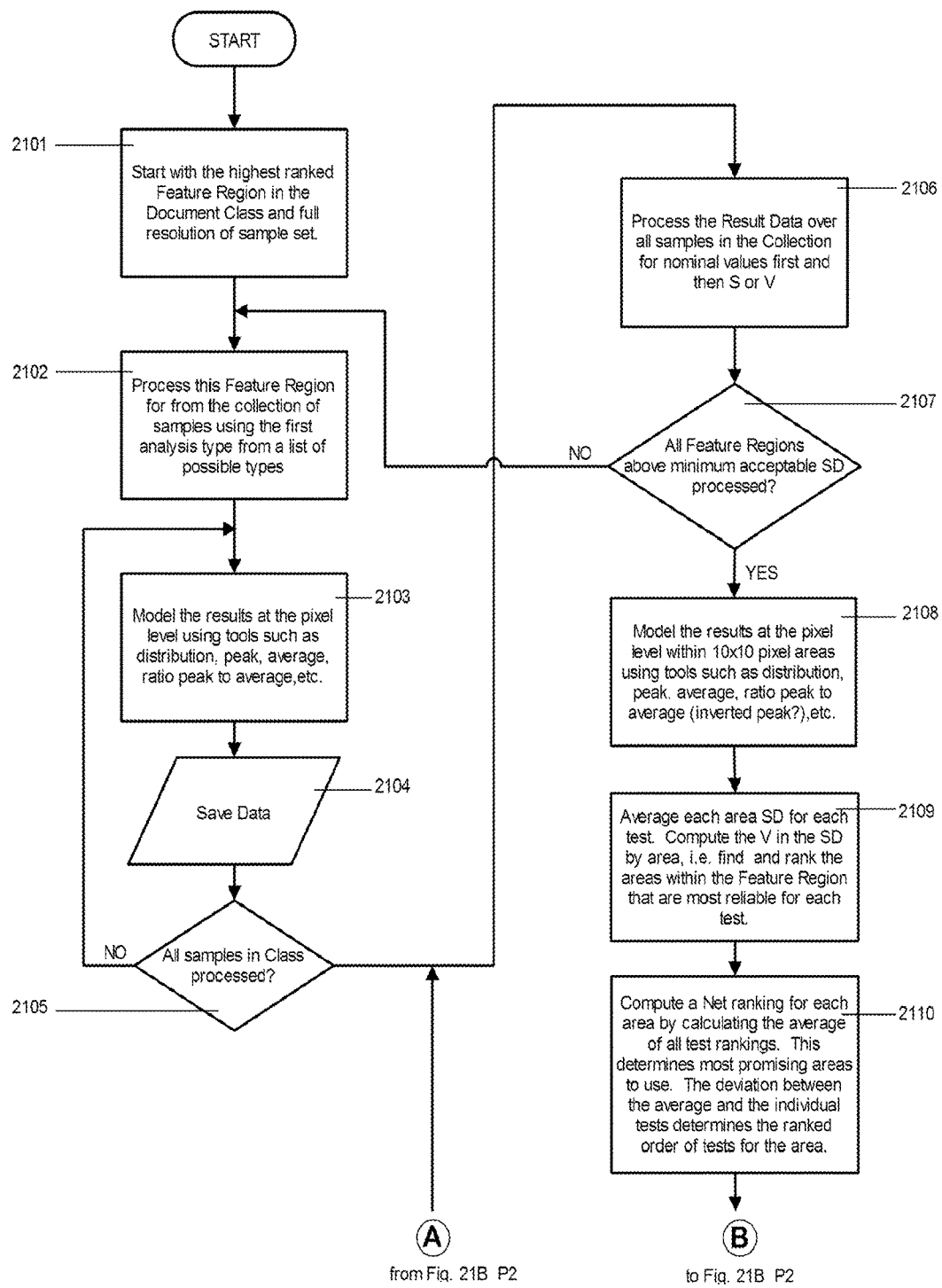

TRAINING OF AUTHENTICATORS P2 of 2

TRAINING FAKE DOCUMENT CLASS

AUTOMATED DATA EXTRACTION TRAINING

CLASSIFICATION (P1 of 2)

CLASSIFICATION (P2 of 2)

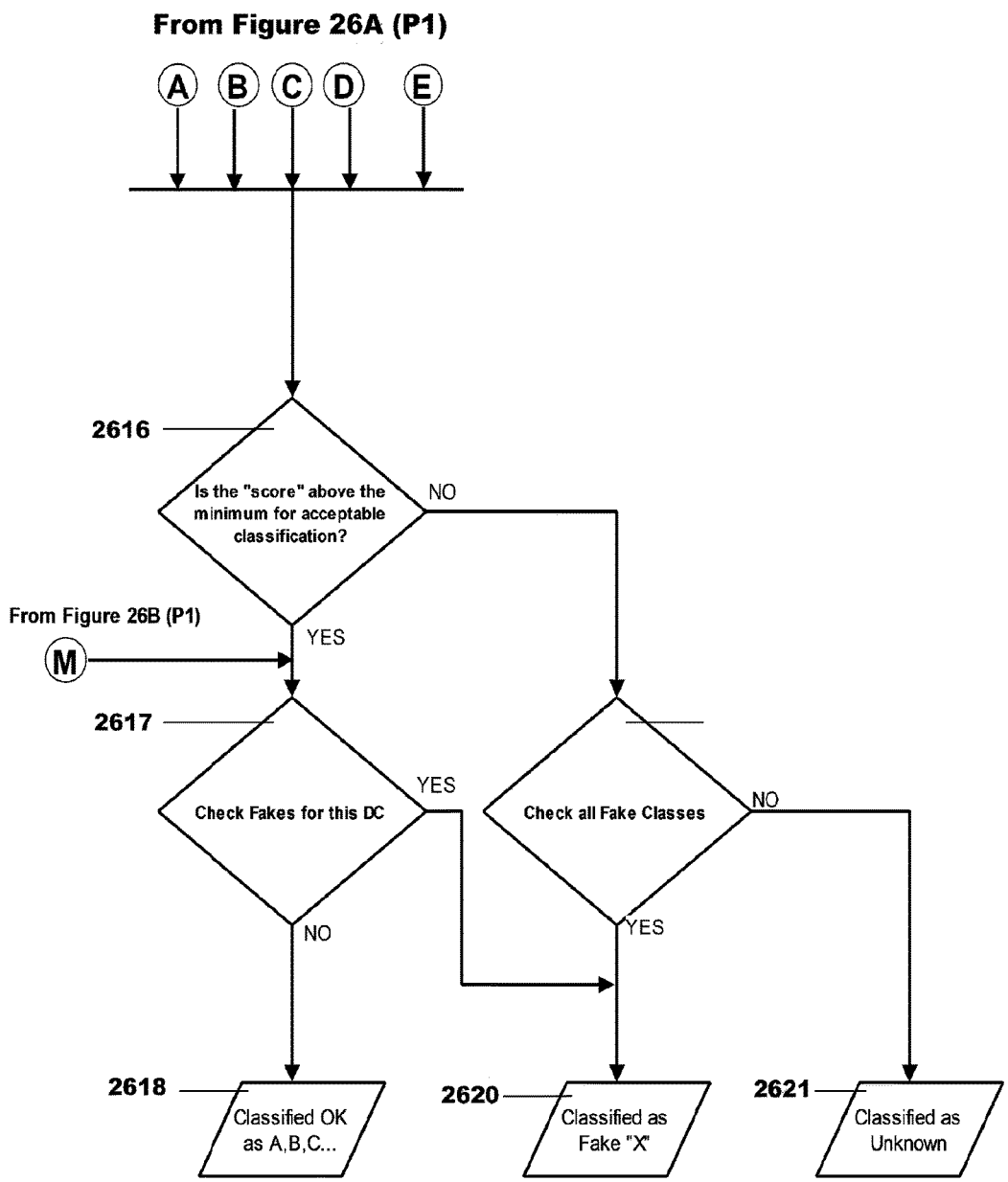

RISK FACTOR CALCULATION

DATA EXTRACTION METHOD

SELF-LEARNING SYSTEM AND METHODS FOR AUTOMATIC DOCUMENT RECOGNITION, AUTHENTICATION, AND INFORMATION EXTRACTION

RELATED APPLICATIONS

The present application is a national stage application, filed under 35 U.S.C. § 371, of PCT Application No. PCT/US2015/036714, filed Jun. 19, 2015, entitled "A SELF-LEARNING SYSTEM AND METHODS FOR AUTOMATIC DOCUMENT RECOGNITION, AUTHENTICATION, AND INFORMATION EXTRACTION," which claims priority to U.S. Application No. 62/014,775, filed Jun. 20, 2014, all of which are hereby incorporated by reference in their entireties.

BACKGROUND

Field of Invention

This patent relates to a method of automatically classifying, authenticating, and extracting data from documents of known format. One important type of document is a personal Identification Document (ID) such as a driver's license, but the invention can be applied to many other types of fixed format documents (i.e. currency, stamps, securities, certificates, permits, invoices, forms, etc.) Images of any type of subject, which can be grouped into classes based on similar properties, will benefit also from this invention. The Pairwise Comparison Nodal Network (PCNN) classification methods described are applicable to most pattern recognition tasks where some assignment of objects to classes is performed. This part of the patent has much broader implications for use than just documents.

Discussion of Related Art

Until recently, the examination and assessment of IDs was usually carried out by human interaction. With training, many examiners are very good at determining the authenticity of an ID or detecting alterations to it. However, the problem has become significantly more difficult as the number of government issued IDs alone has grown to more than 2000 active types and many more that have simply passed an expiration date.

Document inspectors and security personnel cannot be expected to memorize the detailed features of the thousands of different identity document types. Humans are susceptible to fatigue, boredom, distraction, intimidation, job dissatisfaction, bribery, and blackmail. Time constraints on processing travelers at an airport, customers in a line, or patrons in a queue outside a club, or other transaction points, make it difficult to effectively use reference material and inspection aids such as magnifiers, ultraviolet light sources, and measurement tools. These approaches are slow, tend to be inaccurate, and are subject to constraints on security/accuracy.

The motivation for adding machine-readable features to IDs was almost entirely a result of efforts to reduce throughput times. Design standards were developed for international documents such as passports which led to the addition of machine readable zones (MRZ) using the OCR-B font on passports and other types of IDs. Many U.S. driver's licenses originally adopted magnetic stripes but more recently they have been displaced by 2D bar codes (PDF-417 format) under better ID security standards influenced by the REAL-ID Act. OCR-B, barcode, and magnetic stripe readers became common means to automate the reading of IDs and passports.

However, the ability to read the data from an ID document does not equal the ability to authenticate it. An added complication has come from the very technology used to create the newer very sophisticated IDs. The cost of the equipment and supplies needed has plummeted and the access to them and the knowledge of how to manufacture a reasonable facsimile to them has become as close as the Internet. The demand is so large that, through the Internet or via local entrepreneurs, one can simply order customized fake IDs containing your biometrics and whatever personal information one specifies. It became commonplace for fake IDs to be so good that even trained personnel have difficulty distinguishing real IDs from fake ones.

A class of devices known as ID Reader-Authenticators came about in order to help address this problem. The current generation of document Reader-Authenticators automatically identifies the ID and examines overt and covert security features in combination with micro-examination of the inherent and often unintended details, of the issuer's specific production process. As an assistant to a human inspector, these devices overcome human vulnerabilities and actually can audit the process for intentional or unintentional human failures. They examine the ID under multiple light sources using many points of authentication. Some manufacturer's devices perform better than others; however, most are expensive and require extensive memory, storage, and processing capability.

Even in situations where these resources are not an issue, current systems usually require human training of the properties to be used for identifying a document class and what regions on the ID and measurements to use for authenticators. The high-quality forensic expertise required to train these systems to recognize and analyze a document is a limitation on the scalability and dependability of the document classification and the accuracy of the authentic/altered/fake decision. The problem is compounded by the time required for human training due to the variety and complexity of today's high-security IDs. The memory constraints, processing requirements, and training time per feature result in use of only a few points of comparison. This means a reduction in the determinants that can be used to make a decision. For training new types of documents, there is also a lag time for training and testing. With the current automated approach, the lag time for training is considerably shortened.

As technology has advanced, new capabilities such as cloud computing, smart cell phones, and tablets offer the potential for dramatic changes in the way we approach identity verification. Mobile devices with integrated cameras, displays, and respectable processors open the possibility of identity verification at a much lower price point and in many applications that have been cost and performance sensitive. Adoption of this technology requires an ID classification and authentication approach which will operate faster on lower performance devices with less memory and storage.

With cloud or enterprise solutions relying on servers for the processing power, other factors come into play. These include network performance, reliability and vulnerability for real-time processing applications, as well as concern over infrastructure vulnerabilities. There are many applications that can take full advantage of the trend and many for which there is no alternative. However, some are critical and almost total reliant on network availability and secure identity verification assumes the risk of broad failure if availability is lost due to acts of nature, to infrastructure failure, or deliberate attack.

All applications can benefit from a "fall back" mode. This invention removes most of the current human limitations, provides more thorough and reliable authentication, and makes it faster and simpler to add new document types. The reduced requirement for processing power, memory, and storage enables solid performance ID authentication in a stand-alone mode on many mobile devices. It enhances performance on PC platforms, and also enables dedicated network appliances using dedicated devices or commercial mobile devices.

SUMMARY

A self-learning system and methods for automatic document classification, authentication, and information extraction are described. One important type of document is a personal Identification Document (ID) such as a driver's license, but the invention can be applied to many other types of fixed format documents, e.g. currency, forms, permits, and certificates. Given sample(s) of a class of documents (i.e. sample collection), the invention analyzes the collection and automatically chooses the regions and properties of the class that best characterize it and differentiate it from other document classes of the same type. Thereby, it has self-learned how to recognize and authenticate unknown Candidate Documents (CDs) when they are presented for inspection.

An ID can be considered a member of a Document Class (DC) which can be characterized by its issuer (e.g. Massachusetts—MA, New Hampshire—NH, etc.), date of first issue, type (Driver's License—DL, Identification Card—ID, Commercial Driver's License—CDL), and subtype. The system uses automated detailed image analysis of sample collections for each Document Class (DC) to select the Feature Regions (FRs) and associated classification Feature Properties (FPs) (characteristics such as luminance, chrominance, hue, edge information, 2D-FFT, histograms, geometry, etc.) that are most consistent, while masking out the regions and properties that have a large variance. The resultant ranked set of FRs, with associated FPs for each, comprise the DC Multi-mode Feature Vector (MFV). This MFV is a complete description of the DC.

Having chosen the MFV for each Document Class, the task of classifying and authenticating documents is framed in terms of analysis by a 'smart' Pairwise Comparator Nodal Network (PCNN). The PCNN is an optimized efficient method of classification by discriminating pairs of classes but without evaluating all possible pairs.

The core of the Classification process is the creation of a Unique Pair Feature Vector (UPFV) which provides the best discrimination for each pair of Document Classes at every node in the PCNN. At each node in the network an equivalent vector is extracted from the Candidate Document (CD) and matched with the UPFV. The DC that has the better match is chosen as the path to follow in the network. An exact match to the one of the DCs in the pair triggers a secondary process to validate that classification can be completed. If not validated the PCNN process resumes. Automated pre-structuring of the network based on initial probability criteria, learned statistics, and intelligent match detectors optimizes the time and minimizes memory and processing requirements. CDs that do not match a DC are further tested against known examples of "fake" documents and returned as "Unknown" if no match is found.

After Classification, the Authentication process is structured on an adaptive process for comparing extended Feature Properties ranked by consistency, uniqueness, and performance. Comparison is scored on the basis of statistically derived thresholds. The criteria for the thresholds are updated as each new sample is added to the Document Class collection.

The Authentication Training process is comparable to that of the calculation of the MFV. The FRs, which were chosen during the Classification Training, are further segmented into sub-regions and additional properties are measured. The additional property measurements do not have as stringent time constraints and, therefore, can use more complex algorithms. FRs and associated FPs are subjected to a ranking process which adds a ranking factor based on the reliability and uniqueness of the characteristic measured. The combination of multiple FRs and multiple authentication FPs per FR is referred to as a Multi-mode Authentication Vector (MAV). A net sum scoring approach, based on the distance between the MAV for the Document Class and the corresponding vector extracted from the Candidate Document (CD), establishes the reporting criteria for the probability of authenticity. Data and photos can be extracted for transaction logging or further identity validation such as facial matching of the credential photo to the bearer, issuer database, or to a watch list.

Recognition, authentication, and information extraction associated with physical documents (identity cards, forms, passports, visas, licenses, permits, certificates, etc.) are tasks which either involve extensive human interaction, or processing by computers with large memory and computational capability. These approaches are generally slow, inaccurate, and subject to constraints on higher security needs or greater throughput.

This problem is solved by applying processes which identify the most reliably unique properties of each specified document class and each pair of document classes. Areas on a document with variable content are automatically masked out and may be used for information and/or image extraction. This uniqueness is then used to compare the questioned document to each known document class in a pairwise manner.

This invention also teaches methods to automatically learn the most consistent and unique properties and regions with fixed and variable content.

Computationally intensive tasks can be performed in advance and minimized when the questioned document is examined. Simple, fast ordered evaluation provides a substantial improvement in speed and accuracy. This requires much less memory and computation power.

Other systems have to make performance trade-offs due to limitations on memory or computational capacity. These systems also rely upon human intervention to examine a new document class and "teach" the system the properties which are essential to efficient classification and authentication. The high-quality forensic expertise required to train these systems to recognize and analyze a document is a limitation on the scalability and dependability of the document classification and the accuracy of the authentic/altered/fake decision. The memory constraints, processing requirements, and training time per feature result in use of only a few points of comparison. This means a reduction in the determinants that can be used to make a decision.

The elimination of processing/memory constraints, and more complete and accurate evaluation, leads to drastically reduced training times, resulting in the ability to use lower capacity devices such as smart phones and other mobile devices. It also enables true client-server network configurations, and cloud computing. Fast automated system training enables timely, efficient inclusion of limited or one-time issuance documents, such as IDs for one-time events and employee ID cards.

This invention uses unique methods to automatically train classes of documents, i.e., it allows the training subsystem to self-learn optimal parameters for classification and authentication. Thereby, it improves the accuracy and reliability, and shortens the training time.

The invention incorporates an intelligent, adaptive Pairwise Comparator Nodal Network (PCNN) with Multi-mode Feature Vector matching. The PCNN enables very fast and reliable document classification and adapts itself as documents are processed to further optimize performance. These improvements, in large part, are due to the nodal decision method which matches each class pair based on parameters which best differentiate them. Each node uses fewer elements in the Multi-mode Feature Vector (MFV) than otherwise possible, and yet achieves a more accurate similarity test. The Invention also includes an authentication subsystem which progressively matches the Multi-mode Authentication Vector (MAV), learned at the time of training, to compute a dependable risk score which ignores minor discrepancies that might be caused by "wear and tear" or production variances. The MAV match parameters are automatically adjusted as new documents are authenticated.

The runtime process requires less processing power due to extensive use of pre-computation, simple Look-Up Tables (LUTs), and logical and mathematical steps during matching and authentication. Thereby, it is faster and uses less memory and storage.

BRIEF DESCRIPTION OF DRAWINGS

FIG. 19B provides a view of a simple calculation that can accurately differentiate two document classes.

FIGS. 20A, B, and C provide views of exemplary class ordering of the PCNN.

FIG. 26C provides a view of the steps for confirmation of classification.

DETAILED DESCRIPTION

Overview

Figure 1:
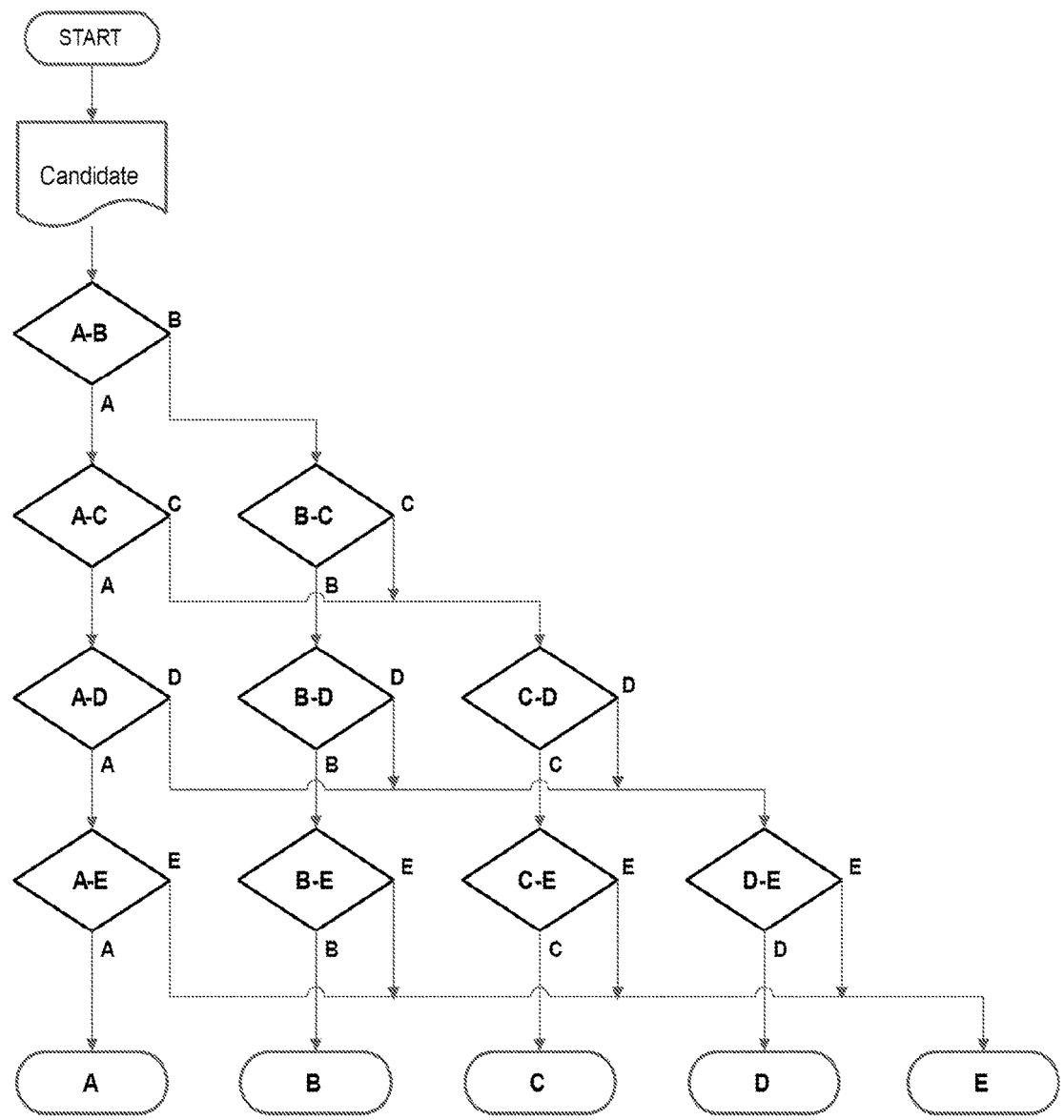
FIG. 1 provides a view of a structure and basic flow of the pairwise comparison nodal network (PCNN).

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, in a computer program product embodied in any tangible medium of expression having computer-usable program code stored therein. For example, some embodiments described can be implemented by computer program instructions. The computer program instructions may be stored in non-transitory computer-readable media that can direct a computer or other programmable data processing apparatus to function in a particular manner, such that the instructions stored in the computer-readable media constitute an article of manufacture including instructions and processes. A computer system may generally include one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device. As will be understood by those skilled in the art, the term computer contemplated herein may be any computer, known or to be created including, but not limited to, a desktop computer, laptop computer, mobile computing device, tablet, smartphone, cloud based computing solution, and the like.

The computerized storage contemplated herein may be any computerized implementation of storing data, either locally or remotely via a networked connection. As will be understood by those skilled in the art, the term computerized storage contemplated herein may be any electronic storage function, structure, or device, known or to be created including, but not limited to, magnetic storage, optical storage, distributed across multiple devices, a node storage architecture, local on a computer, remote from a computer, in a public or private cloud, and the like.

Generally, the present invention concerns a computerized system for classification and authentication of an item capable of and/or requiring authentication. Such an item may be a document, for example an Identification Document (ID). The present invention includes aspects for training the system for classification and identification, as well as the classification and authentication process aspects. In operation, the classification (that is, the determination of document type/class being analyzed) phase is performed before the authentication (that is, the authenticating and validating of the information of the document) phase. In other words, the system must first determine what type and class of document it is analyzing before it can authenticate and validate. The present invention utilizes a pairwise comparison strategy, as discussed in detail below, to classify the document as one of a plurality of document classes. Each pairwise comparison is a node in a structured network of nodes. The result of the nodal comparison is an identification of the class of the document. Once the document class known, the computerized system may begin to analyze and validate using any number of techniques. The present invention allows a computerized system to very rapidly, and with few processing steps, identify a document's class, at which point more specific validation and analysis can be performed to identify the particulars of the document. In a particular embodiment, the system can quickly identify that the document is a Massachusetts driver's license, and then may perform analysis to determine and extract the name on said document, photo, date of birth, and the like.

Speaking generally, the present invention may be used for classification and authentication of any item capable of being authenticated. These items may include documents as described above, and may also include any other item, tangible or digital. Specific examples may include currency, art, stamps, and other collectibles, securities, images or other digital database items (such as digitized photographs of animals, plants, boats, cars, and the like). However, it should be understood that many other items capable of being authenticated are also contemplated by the present invention. While the term "document" is used throughout, it should be understood that this is provided solely as an example of the many types of items capable of classification and authentication by the present invention.

The Pairwise Comparison Nodal Network (PCNN) must be initially prepared and trained to allow for comparison. Initially, in a first phase, electronic representations of one or a plurality of documents of the same class may be acquired and input into the system by scanning, photographing, other imaging, and the like. The classification of these document is then input. At this point, the computer automatically breaks each document into a plurality of regions, and identifies measurements on each region (such as color, shape identification, luminance, and the like, among other measurements). All document classes will have data on the same measurements. Once analyzed, the computer will compile the sum of the information measured by the computer as a Feature Vector for the document class. This process can then be repeated for all available document classes—for example all driver's licenses from each state. In one embodiment, an end result of the feature vector may be approximately 300 analyzed regions of the document, with approximately 2400 measurements (there being eight from each analyzed region) which are each expressed as a number and information instructing the computer what to look for when next analyzing and classifying a document.

In a further embodiment, the computer may automatically identify variance of measurements within the same document class. This allows the computer to identify the least and most consistent areas of a particular document class. For example, typically edges of documents are the first to become damaged, which may lead to the computer identifying edge regions of a document class as least consistent.

After the feature vectors for each document class are prepared, the second phase of the training involves the computer automatically identifying the Inter-class Feature Vector (IFV)—which is a collection of the measurements of the features of a feature vector that best distinguish one document class from another. Each inter class feature vector will contain a number of measurements that best distinguish document A from document B— this information will be used for a particular node of the nodal network. For example, of the 2400 measurements from the feature vector, in one embodiment approximately 20 measurements may be the best distinguishing. As such the inter class feature vector will comprise these 20 measurements. The Inter-class Feature Vector preparation can be done in advance, with the results stored, or may be done on the fly by the computer's processor during each classification event.

The computer, or any other computer using the generated and trained PCNN may then use this Inter-class Feature Vector when classifying the document by determining if the document being scanned (or otherwise being electronically represented) best corresponds to document A or document B. As discussed in detail below, once an inter class feature vector is characterized automatically by the computer between each pair of documents analyzed, the Pairwise Comparison Nodal Network can be created. When presented with a document for classification, the computer may compare the nodes in order and the resultant "winner" from the pairwise comparison will be the class of the document.

The above computer-determined information may then be stored on a memory of a computer with instructions for a microprocessor to carry out this pairwise nodal comparison. A result of these steps will be an instruction to the computer of what class the particular document being analyzed is (a Massachusetts driver's license perhaps). At this point, the computerized system can perform more particular a detailed analysis to confirm validity of the document. Going further into a specific embodiment, the inter-class features are used to compare a Candidate Document to each known Document Class in a pairwise manner. Pairwise comparison with large numbers of classes can be problematic due to the large number of possible pairs. A Pairwise Comparison Nodal Network is described here which allows for very efficient processing at various stages of the classification and authentication processes. Computationally intensive tasks can be performed in advance and processing minimized when the candidate document is examined. Simple, fast, ordered evaluation provides a substantial improvement in speed and accuracy. This requires much less memory and computation power, yet it provides greater performance. This solution allows document recognition faster on standard processors and, even more notably, on mobile devices.

Solutions implemented using this invention will allow more thorough and faster document examination. Training and updating for new documents will be quicker and can be automated. It will be easier to add support for limited production ID documents for requirements, such as access control, local law enforcement, first responders, educational institutes, HAZMAT workers, and special event and employee badges. The solution, due to its efficient processing, is a good match for use on mobile devices, POS terminals, clients in client-server networks, and in cloud applications.

This invention can be used for any application involving sorting, selecting, or detecting a defect, feature, object, or individual from an image. Different applications of the invention enable identification, selection, and validation of all types of documents, logos, art, currency, or virtually any image of an object, person, place, or thing, even on a mobile device.

The Use of Pairwise Comparator Nodal Networks (PCNN)

The most straightforward and classical approach to pattern recognition involves taking a candidate token and extracting a set of features from it and then comparing this set of features with the sets of features from known classes of tokens. The candidate set is compared with the set for each of the known classes. A similarity measure of some sort can be calculated between the feature vectors. The token is then classified as being a member of the class to which its feature set is most similar or closely matched. This approach basically weights all measured features in a similar manner in making the classification. Other approaches, in effect, utilize known examples of tokens to do a training which could automatically weight the input features optimally to make a correct decision as to the class.

Pairwise comparison is a venerable technique of analysis in many different fields. In pattern recognition, the basic problem is to identify a candidate token as belonging to a particular class of tokens. In the case of documents, we want to identify a candidate document as a member of a particular Document Class (DC). Members of a class share some common characteristics that would cause them to be labeled the same or similar in some broad sense. The basic notion of pairwise matching is to break down a decision problem into smaller manageable pieces. Rather than considering all possible outcome classes at once, each class or alternative is considered in relation to only one other class or alternative. In a classical pairwise comparison approach, one would consider all possible combinations of pairs and get a decision for each one. The class that gets the most decisions in its favor in such a process is considered the most likely class. Pairwise Comparator Nodal Networks (PCNN) represent a more efficient manner of performing pairwise comparisons and are described in the next section. In the invention disclosed herein, the task of classifying and authenticating documents is framed in terms of analysis by a Pairwise Comparator Nodal Network (PCNN). The advantage of this approach is the use of fewer and less complex computations. This can result in faster accurate matching, even on lower performance processors. Some background on the basic operation of the PCNN is explained in detail below.

Basic PCNN

Rather than a model where the candidate document is compared to each of the known document classes using all the features in the feature set, we develop a module that simply determines whether the candidate token is more similar to one known class or an alternate known class. An "AB" discriminator node can decide whether a candidate is closer to being a member of Class A or to Class B. It does this test whether or not the candidate is either a member of Class A or Class B or something else. However, in any case, the node does make a decision one way or the other as to the candidate being closer to Class A or to Class B.

In classic pairwise comparison, for a given set of classes, pairwise comparison tests could be done on all possible pairs. A matrix of all possible pairings for a set of five possible classes, {A, B, C, D, E}, would be the following:

| AA | BA | CA | DA | EA |
| AB | BB | CB | DB | EB |
| AC | BC | CC | DC | EC |
| AD | BD | CD | DD | ED |
| AE | BE | CE | DE | EE |

There is no need to have both an AB and BA node pairing since these are equivalent, nor a self-pairing node AA, BB, etc. So we are left with the following useful node pairings:

| AB | | | |
| AC | BC | | |
| AD | BD | CD | |
| AE | BE | CE | DE |

For the example class of 5 members, {A, B, C, D, E}, this would yield a total of 10 useful node pairings (nodes). The total number of nodes (N) is related to the number of classes (K) as follows (where * indicates multiplication):

$$N=((K*K)-K)/2 \text{ or equivalently, } N=(K*(K-1))/2$$

For the case of a set of 5 classes, the calculation is as follows:

$$N=(K*(K-1))/2$$

$$N=(5*(5-1))/2=10$$

In a more classical analysis, each node in the network would be evaluated. This could be considered a form of voting scheme where each node votes for a candidate. The candidate with the most votes wins the election.

In a classical pairwise comparison approach, all nodes might be evaluated. For our example case with 5 classes and 10 useful nodes, let us assume that the nodal results are as follows:

| AB -> A | | | |
| AC -> C | BC -> C | | |
| AD -> D | BD -> B | CD -> C | |
| AE -> A | BE -> B | CE -> C | DE -> E |

Under this example, we see the following results:
A gets 2 votes
B gets 2 votes
C gets 4 votes
D gets 1 vote
E gets 1 vote In this example, we evaluated all useful nodes and tallied the results. We note that all nodes involving C were unanimous in selecting C. C won the election and the candidate is assigned to Class C.

Next we develop the concept of a Pairwise Comparator Nodal Network (PCNN) which offers advantages over the classical pairwise comparison approach which evaluates all pairs. In a PCNN, not all nodes need be evaluated. A diagram of a PCNN for 5 classes, {A, B, C, D, E}, is shown in FIG. 1.

Traversing from top to bottom, only a single node on each row need be evaluated. For the example above, where the candidate is assumed to be class C, the following nodes would be traversed:

```
AB -> A
AC -> C
         CD -> C
         CE -> C
```

Rather than all 10 nodes in our example scenario, we only have to traverse 4 nodes, one in each row of the PCNN. This can provide a significant speed and efficiency advantage. If there are K classes, then only K−1 nodes need be traversed.
Validation PCNN Level In this scenario, we still might want have a little more confidence in the result by checking all the nodal results for the apparent winner. In the example above, due to the method of traversing the tree, we see that the BC node was never traversed, even though the outcome was C. So as a second stage check on the initial result, we could go back and run any untested nodes involving the initial winner.

Under ideal circumstances in our example, the secondary test on node BC will result in the choice of C:

$$BC \rightarrow C$$

Again we will have achieved a unanimous vote for C but with only traversing a total of 5 nodes instead of 10. This numerical node advantage increases exponentially with the number of classes.

As we have seen earlier, on the initial PCNN analysis, the number of nodes traversed (N) where there are K classes is simply:

$$N = K - 1$$

The best case scenario for traversing minimal nodes overall would be for the class to be A. In this case, all 4 nodes involving A would have been traversed and no secondary tests would need to be done:

$AB \rightarrow A$
$AC \rightarrow A$
$AD \rightarrow A$
$AE \rightarrow A$

Thus the minimal number of nodes to be traversed is:

$$N_{min} = K - 1$$

The worst case scenario for missed winning nodes in the above example would be if the candidate was actually a member of class E. In this case only one of the nodes (DE) in the set {AE, BE, CE, DE} would have been used in the initial pass through the PCNN. There would still be the 3 nodes involving E that would be needed to help validate the initial PCNN result.

So adding in the validation nodes, the maximal number of nodes needed (M) would be the initially traversed nodes (always K−1) plus the maximum number of untraversed winner nodes (K−2):

$$N_{max} = (K-1) + (K-2)$$

$$N_{max} = (2*K) - 3$$

Thus we can see that the total number of nodes traversed with a secondary validation step would be in the following range:

$$K - 1 \leq N \leq (2 \cdot K) - 3$$

Recall that if all useful nodes in a PCNN were evaluated the number of nodes traversed would be $$N_{all} = (K*(K-1))/2$$

Figure 2:
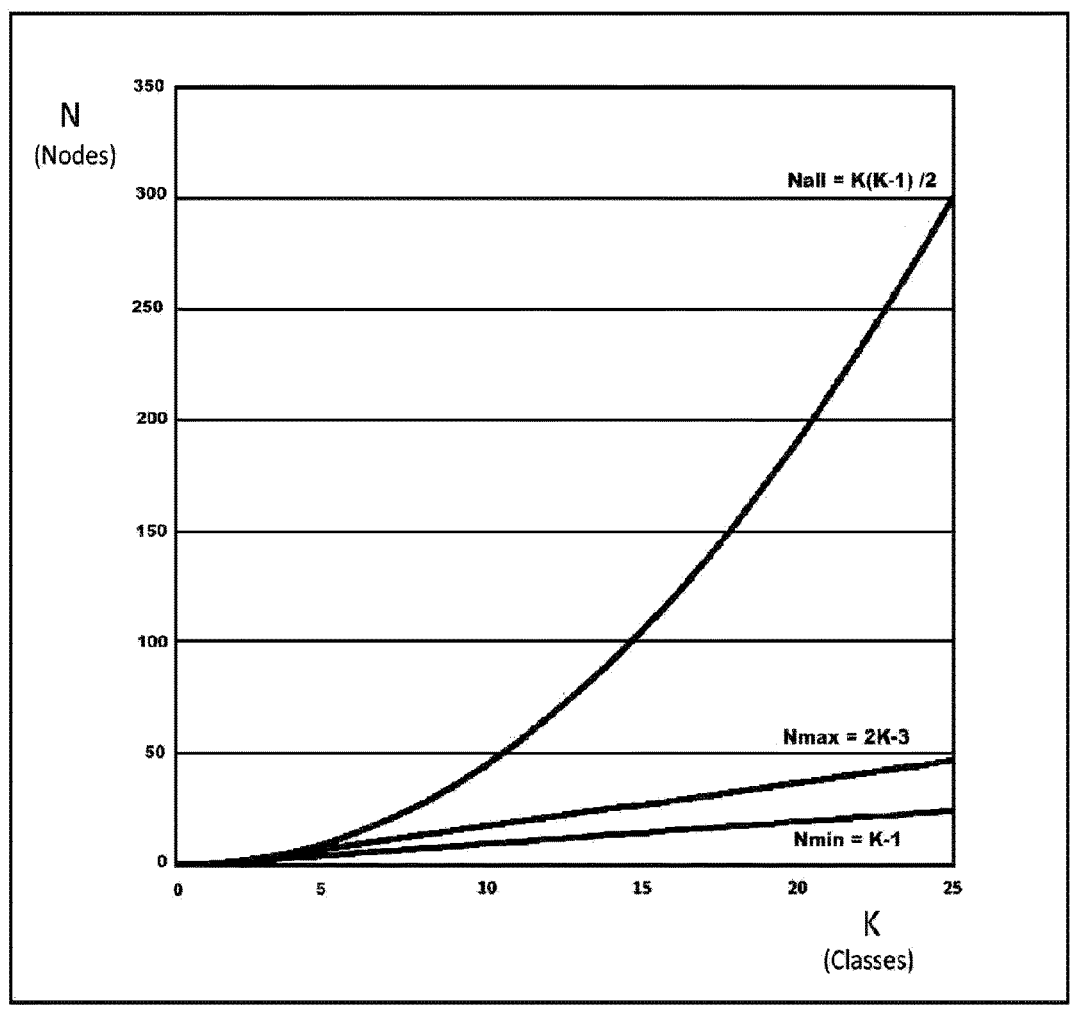
FIG. 2 provides a view of a benefit of PCNN versus conventional methods.

A graph is provided in FIG. 2 which illustrates the nodal advantage of the PCNN approach. Plotted are $N_{all}$, $N_{max}$ and $N_{min}$ versus K, the number of classes. The area between the $N_{min}$ and $N_{max}$ lines represents the range of nodes traversed that would be expected.

The arrangement of nodes in the PCNN also plays a role in getting to the proper answer faster. For maximal efficiency and to minimize the average number of nodes to be traversed, the classes for the PCNN should be arranged in an order where the most probable class is first and the least probable class is last. The fewest nodes will be traversed if the network is optimized with the most likely class outcomes in the highest levels of the network (leftmost column of the PCNN). If this is the case, it is more likely that more of the tests for a token of a more frequent class will be traversed in the initial pass through the network. In such a case, there will be fewer pairwise nodes that will need to done to validate the class result. This will lead to the number of nodes being traversed being close the $N_{min}$ than $N_{max}$. Dynamic ordering of the classes is an important part of the invention. Based on recent result statistics, the order of classes can be arranged by merely reordering their indices.
Handling Unknown Candidates For any pattern classification task, we have the issue of dealing with candidates that are not part of any of the known classes. In our example, let us examine what might happen when an unknown candidate (X) is presented to the PCNN which is not a member of any of the existing classes, {A, B, C, D, E}.

| AB -> B | | | |
| AC -> C | BC -> B | | |
| AD -> A | BD -> B | CD -> D | |
| AE -> E | BE -> E | CE -> C | DE -> D |

With this PCNN the initial pass would end with Class E being chosen with the sequence of nodes: AB, BC, BD, BE. A tally of all nodes would yield the following vote totals:

| | |
|---|---|
| A | 1 vote |
| B | 3 vote |
| C | 2 vote |
| D | 2 vote |
| E | 2 vote |

Under this situation, there appears to be no clear winner. The initial choice E has only 2 votes, and even B, with the most votes, lost to E. Under such a circumstance where there is no clear winner (by some defined threshold of acceptance, e.g. non unanimous by a certain number of votes), we could define the candidate as not being a member of any of the defined classes {A, B, C, D, E} but rather as belonging to an "Unknown" class U.

If no clear result was found in the PCNN analysis, then there could be an analysis of all possible nodes and a standard voting process to see which class received the most votes. This could be an alternate procedure in a situation where we know that the candidate has to be a member of the class set.

Another method of validating a final class choice would be to have additional tests to essentially validate the final choice. This could involve measuring the candidate feature set against the standard feature set for the class (excluding the variable features for that class). Conceivably this could result in the use of features that would not have been used heavily in the nodal analysis. It would however be more like a template matching procedure, measuring the similarity of the candidate to that of the class template. If the match similarity was above some pre-determined match threshold, then the class result could be considered validated. If not, then the candidate would be classified as "Unknown".

Multilayered PCNN

The larger number of classes, the larger number of nodes required. For example, a class size (K) of 96 would require 4560 nodes to be developed and stored with a maximum of 189 to be traversed (Scenario A).

| Name | K | $N_{all}$ | $N_{min}$ | $N_{max}$ |
|---|---|---|---|---|
| PCNN | 96 | 4560 | 95 | 189 |

What if we had a pre-classifier that could accurately sort the candidate into 4 smaller classes, each with 24 members (Scenario B)?

| Name | K | $N_{all}$ | $N_{min}$ | $N_{max}$ |
|---|---|---|---|---|
| PCNN-1 | 4 | 6 | 3 | 5 |
| PCNN-2a | 24 | 276 | 23 | 45 |
| PCNN-2b | 24 | 276 | 23 | 45 |
| PCNN-2c | 24 | 276 | 23 | 45 |
| PCNN-2d | 24 | 276 | 23 | 45 |
| Total | 100 | 1110 | 95 | 185 |

Under the Scenario B, there would only need to be 1110 nodes developed and stored versus 4560. The maximum number of nodes traversed in our example would roughly be the same (185 vs 189). If instead we broke the initial 96 classes into 8 groups of 12 each (Scenario C), we would have the following result:

| Name | K | $N_{all}$ | $N_{min}$ | $N_{max}$ |
|---|---|---|---|---|
| PCNN-1 | 8 | 28 | 7 | 13 |
| PCNN-2a | 12 | 66 | 11 | 21 |
| PCNN-2b | 12 | 66 | 11 | 21 |
| PCNN-2c | 12 | 66 | 11 | 21 |
| PCNN-2d | 12 | 66 | 11 | 21 |
| PCNN-2e | 12 | 66 | 11 | 21 |
| PCNN-2f | 12 | 66 | 11 | 21 |
| PCNN-2g | 12 | 66 | 11 | 21 |
| PCNN-2h | 12 | 66 | 11 | 21 |
| Total | 104 | 556 | 95 | 181 |

Under Scenario C, there would only need to be 556 nodes developed and stored versus 4560. The maximum number of nodes traversed in our example would still be roughly the same (181 vs 189).

Consider yet another scenario (Scenario D) where each of the 2 level PCNNs in Scenario B, each containing 24 classes, is divided into 4 subgroups each containing 6 classes. The totals for this three level nested PCNN would be the following:

| Name | K | $N_{all}$ | $N_{min}$ | $N_{max}$ |
|---|---|---|---|---|
| Total | 112 | 264 | 92 | 164 |

Here only a total of 264 nodes versus 4560 need be developed—a substantial saving. Nested PCNNs could result in overall smaller PCNNs and thus lower storage requirements for nodes.

Consider a few cases where multilevel PCNNs can be used for classification:

PCNN Pre-Classification Size Layer

We have seen that there is an advantage to a multilayer hierarchical approach in using PCNNs. In the case of IDs, there are certain major classifications by size of IDs. By ICAO Document 9303 definition, there are three major size categories, ID-1 (driver's license size), ID-2 (intermediate size), and ID-3 (passport size). The entire set of classes of IDs may include classes of each of these types. Rather than have a PCNN which has to deal with both ID-1 and ID-3 IDs in the same set of classes, we could use the multilayer approach to first determine the size category (class) and thus have only ID-1 sized candidate documents compared to classes of ID-1 classes, leading to far fewer overall PCNN nodes.

There is some actual minor physical variability in the size of documents in a set of classes. A more significant source of size variability may be introduced by the scanning process itself. Imaging devices such as cameras may introduce some degree of shortening in the X or Y direction leading to approximate sizes. Fixed type scanners may have little variability but in the case of images, e.g. from a mobile phone camera, there may be significant distortion. In this case, we may not actually know the true physical dimension of the ID from the image since the focal length may be arbitrary leading to variable resolution images. We may categorize together ones with approximately the correct relative dimensions, say Height to Width ratio, H/W.

Figure 3:
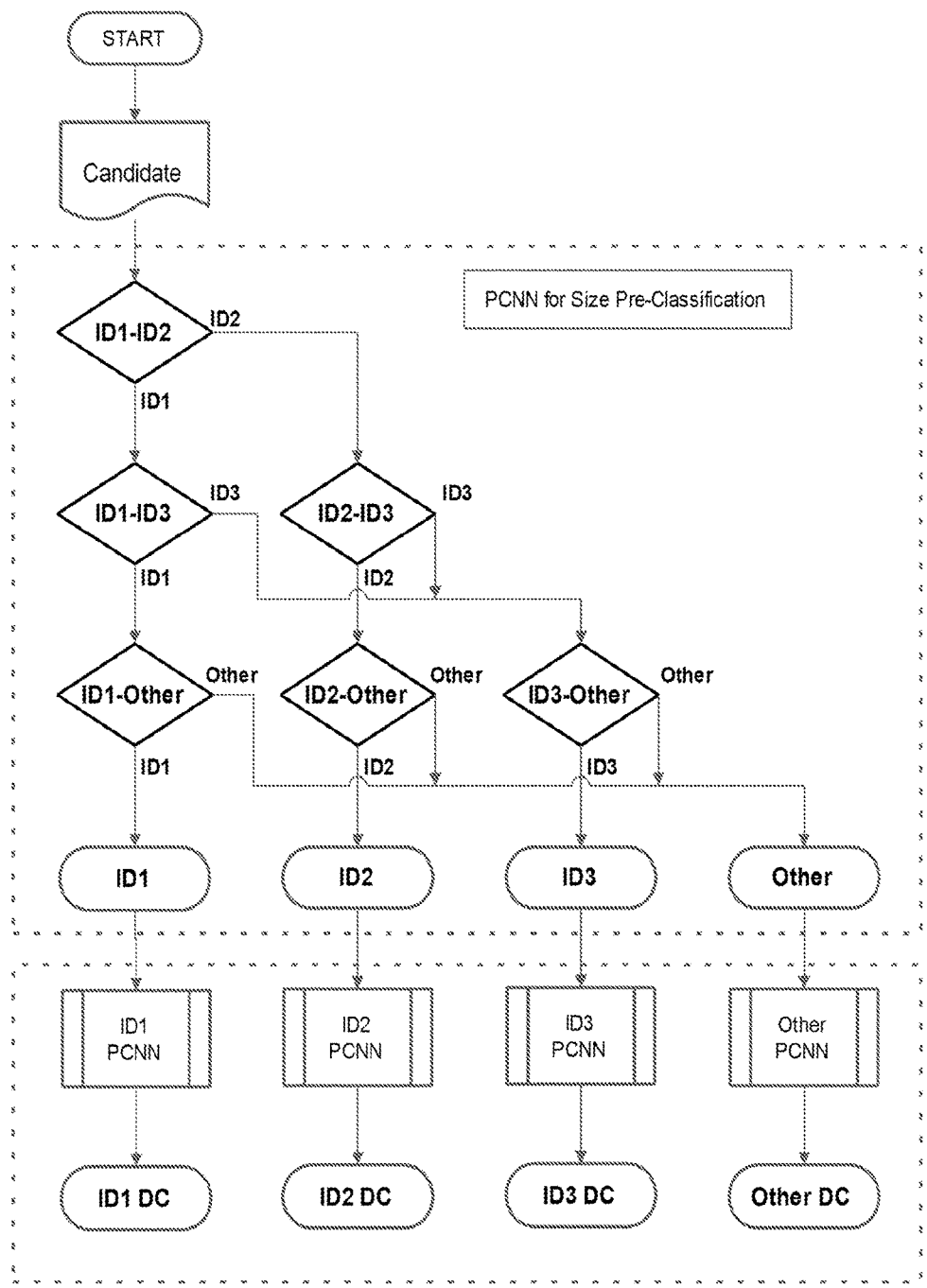
FIG. 3 provides a view of a how a PCNN is used for document size determination.

We introduce a preprocessing sizing PCNN layer where the classes are basically defined as ID sizes rather than specific ID types. For the case of IDs, the classes may be {ID-1, ID-2, ID-3, Other}. The feature set in this case could consist of size related parameters such as H/W (in order to be size independent). The output of this process would be the size class. Then the document would be passed on for classification to the appropriate sub-class PCNN (e.g. the PCNN which contained only ID-1 classes). FIG. 3 illustrates such a size analysis PCNN based layer.

PCNN Pre-Classification Barcode Layer

If an ID has already been pre-classified as to Jurisdiction (e.g. Massachusetts) by means of reading of Barcode, Magnetic Stripe (BCMS), or optical character recognition (OCR), there is still a need for it to be further classified into a particular type of ID (CDL, U21, 2004 vs 2007). In many cases, the Barcode/Magnetic Stripe format is the same even though the image on the front is different. The further classification of type of ID can be done very efficiently via the PCNN approach and will be very quick due to the small number of classes.

Note that the PCNN does not need to be designed. The PCNN is formed algorithmically solely based on the set of classes to be used.

The classification based on Barcode or Magnetic Stripe (BCMS) reading can also be framed with a PCNN approach. Instead of images, we just view the features of the BCMS and develop equivalent tests based on text strings vs image regions or characteristics.

PCNN Authentication Layer

Thus far we have examined how a PCNN might be used in the classification process. It can actually be used at any stage in the document authentication process. Assuming that classification has already been done, the authentication step is really a case of taking an ID that has been classified and then further categorizing it as belonging to the "valid" class V, one of a number of identifiable "fake" classes F1, F2, . . . , or as an arbitrary fake class F. The PCNN approach can be used to add higher levels of authentication (lower risk of forgery) than would otherwise be possible in real-time applications or on lower capability devices.

Document Orientation Handling

Depending on the type of document and the type of scanner, there may be cases where the candidate image may be presented to the classifier module in one of several orientations. Consider the case of an ID-1 (driver's license sized) document, which by published standards is nominally of dimensions (H=60 mm, W=92 mm). With preliminary size sorting (possibly by a size based PCNN), the front ID image can be in one of two orientations. We could also perhaps make an assumption that the probability of a properly oriented ID is higher than one upside down (180 degree rotation). One approach would be to have a PCNN that is set up with classes consisting of properly oriented ID classes. If the result of this approach is that there is no good match, then the candidate ID would be submitted to a second PCNN of rotated ID classes. If the feature vector has measures dependent on a regular grid, then that portion of the feature vector can be very simply transformed by grid position index into a rotated feature set. If the rotated PCNN classification is successful, the process is complete. If not, then we have an "Unknown" class which is submitted to the "Unknown" PCNN process.

An alternate approach utilizes an orientation determination process (PCNN) within a given node (e.g. AB). With that PCNN, we make certain assumptions as to the probability of occurrence of each of four possible conditions. These are {A1, B1, A2, B2} where the members are defined as follows:

A1—Class A, oriented correctly
B1—Class B, oriented correctly
A2—Class A, rotated
B2—Class B, rotated
Note: 1 indicates normal orientation, 2 indicates rotated 180 degrees orientation We then utilize a rotation PCNN which consists of 6 nodes to classify into one of these 4 classes, {A1, B1, A2, B2}.

| A1-B1 | | |
| A1-A2 | B1-A2 | |
| A1-B2 | B1-B2 | A2-B2 |

Figure 4:
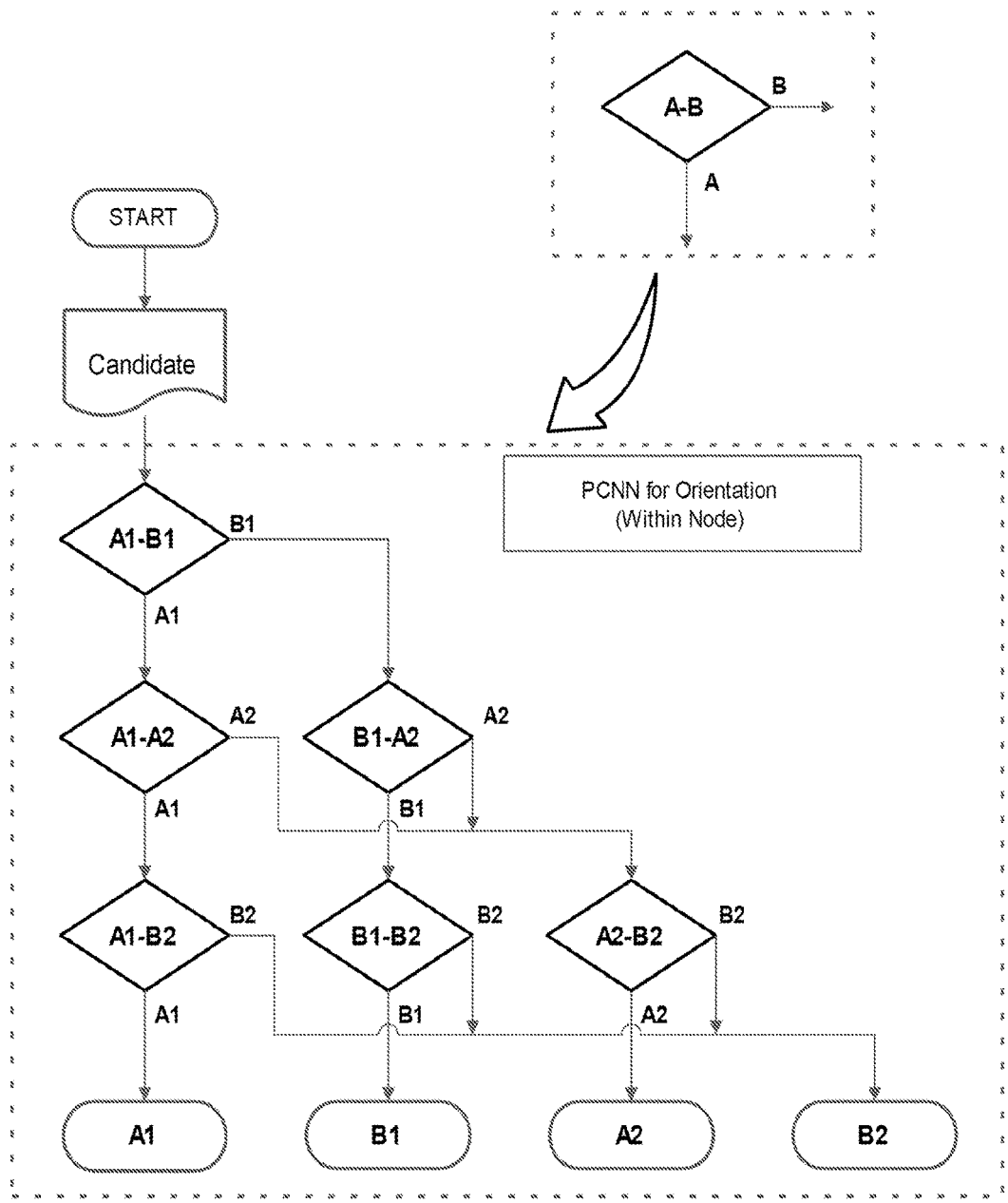
FIG. 4 provides a view of a use of PCNN to resolve issue of upside down document scan.

The result would be a forced result of one of these classes—that is both a Class name (A or B) and an orientation (1 or 2). If the result was A2, then it would tell us that the class was A, and that the orientation (2) was rotated. From here on through the PCNN, any node involving A would assume an orientation value of 2. The structure of the PCNN is illustrated in FIG. 4.

Within any further nodes involving A, the class A1 would not have to be considered. In the example, the next node to be processed would be AC. Within this node, there would only need to be three classes considered, {A2, C1, C2} or alternatively, any node in the rotation PCNN involving A1 would automatically have the result going to the alternate choice. In our example, within the AC node, the A1-C1 node would go to C1.

Speed Versus Memory

There may be tradeoffs necessary between speed and memory in certain situations. These might depend on the type of device on which the PCNN is implemented, e.g. desktop vs mobile device. As we have seen, if the number of classes is large, the PCNN can also be quite large. For instance, a class size K of 1000 would result in a total of 499,500 pairwise nodes. We can gain a speed advantage by having the logic in these nodes pre-computed in the training phase but at the cost of storing the data containing that logic.

On the other hand, if there are memory limitations, we might wish to not actually pre-compute the pairwise comparison logic and store it, especially if a large number of classes are being used in one PCNN level. We would however store the basic feature sets for each of the classes. Then as a given node is needed, the test for that pairwise node would be computed on the fly given the two class feature sets that were involved. Basically this would consist of the training process done in real time but without the burden of storing all the nodal logic. However, since the PCNN approach minimizes the number of nodes traversed, this speed degradation may be tolerable for certain situations. This approach might be more practical in a case where the computing unit might be a mobile smart phone processor, provided of course that the nodal computation time is acceptable for the given situation.

Nodal Confidence Factor

Thus far, we have discussed the case where a given node could have two possible results (e.g. for Node AB, the result could be either A or B.) However, a given node could provide not just a binary result for one class or the other, but could also provide some measure of confidence in that vote on a particular scale (e.g. 10 could indicate a strong confidence while 0 could indicate very low confidence.) This auxiliary data could be taken into account when determining the relative strength of a nodal result.

Application Areas

Verification of true identity before the issuance of IDs, before the granting of rights and privileges, and at the time of controlled activities, is essential. Authentication of IDs plays a key role in these processes. The invention may be used on general purpose processors with images captured remotely or on attached scanners. It may also be embedded in devices with integrated imagers (cameras) such as smart phones or tablet computers. Also, the invention may be embedded in dedicated document reader-authenticators or network appliances.

There are two categories of transactions where a need exists to prove identity or to authenticate a document. The categories are where there is real or intrinsic value to be transferred, or when entitlement is being granted to take an action.

In the first category, the potential consequence for failure to correctly identify/authenticate is financial loss. Examples of such transactions are those which involve the exchange of value for such items as currency, credit/checks, securities, property/goods, rental/lease, loans/advances, services, insurance payouts, and investments.

In the second category, there is usually an added risk to property, to quality of life, and even life itself. Examples of these transactions are those that involve entitlement to: access restricted areas, cross borders, purchase firearms, alcohol, explosives and other hazardous materials, dispense drugs, drive motor vehicles, pilot planes, provide professional services, board airplanes, and utilize club membership.

Often the steps used to ascertain identity in one category are also of use in the other. However, the risk, reward, and time criticalness of the validation of the identity, at the point of presentation of the claimed privilege or transaction authorization, varies considerably. In order to differentiate the two categories, category one can be referred to as financial fraud and the other as entitlement fraud. Both are enabled by alteration of material identity information, theft or use of another person's identity, or fabrication of a unique identity. Some typical application areas requiring ID verification include the following:

Identity Fraud: The Identity Fraud problem is very well known and has been an issue for centuries. The credentials (IDs) used to establish identity have evolved from various tokens, wax seals, and signet rings to today's sophisticated "smart" cards, intricate optical security features, and embedded biometric pointers. The steps to address the problem remain the same. First the bearer presents the token of their claim to an identity. Then the authority approving the transaction examines the token for relevance, authenticity, and its ownership by the bearer. Lastly, the authority attempts to determine what the risks are in granting the privilege or carrying out the transaction being sought. Because of the pervasive impact on society from identity fraud, it is this application which is the embodiment focused upon herein. Identity Fraud is a global problem which groups the impact of identity theft and the use of fake identities. The impact of Identity Fraud ranges from stress and inconvenience, to financial losses, and even to massive loss of life. Virtually all criminals and terrorists rely upon Identity Fraud to facilitate their activities. This support may be in association with the direct criminal activity, financing of the activity, transportation to/from/planning it or, avoidance of apprehension and prosecution for the crime.

Underage Screening: One of the largest commercial application areas for reliable ID authentication is in the area of screening of underage individuals from either entrance into facilities (e.g., bars, clubs, gaming facilities) or for purchasing of goods (e.g. alcohol, tobacco). The usage of fake IDs is rampant among late high school and early college age students. The easy internet availability of high quality fake IDs has exacerbated the problem for operators of liquor stores, bars, clubs, restaurants, convenience stores, and gaming facilities. They can face large fines or even lose their license to operate if they are found to have admitted or sold restricted product to underage patrons.

Border and Transportation Security: Obviously, there is a strong need to check the identities of those crossing a country's border. Likewise, checking the identity of those boarding a plane or other forms of transportation is important. Ascertaining whether a traveler is using a genuine ID or extracting their information to see whether they are on some form of watch list is an important safeguard.

Visitor Management: Knowing who is entering a facility is extremely important in the age of modern terrorism, school or workplace shootings, industrial espionage, etc. Those intent on these activities will often use falsified identity to gain access to a facility.

Employment Screening: Basic employment requires a certain degree of certification of eligibility for employment. The basic I-9 form used in the United States requires the presentation of certain identity documents to the employer. The use of fake documents for this purpose has been quite common.

Enrollment: It has become more important to check the validity of "breeder" ID documents. One form of ID fraud involves using false IDs in the application process for other valid ID documents (e.g. using a false driver's license from one state to apply to another state or for a passport).

DESCRIPTION OF EXEMPLARY EMBODIMENTS

Figure 5:
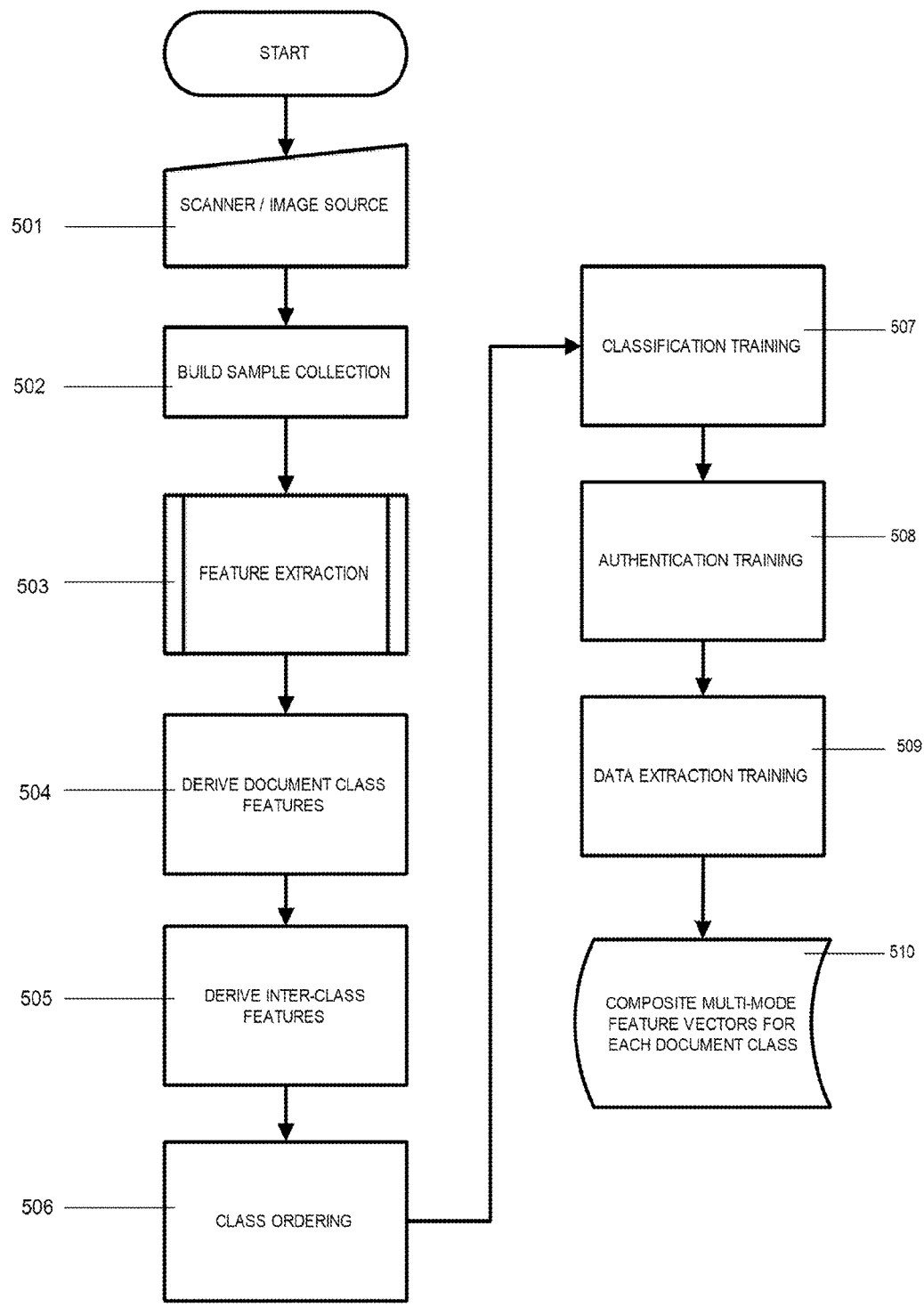
FIG. 5 provides a view of an overall flow for the Training Phase.
Figure 6:
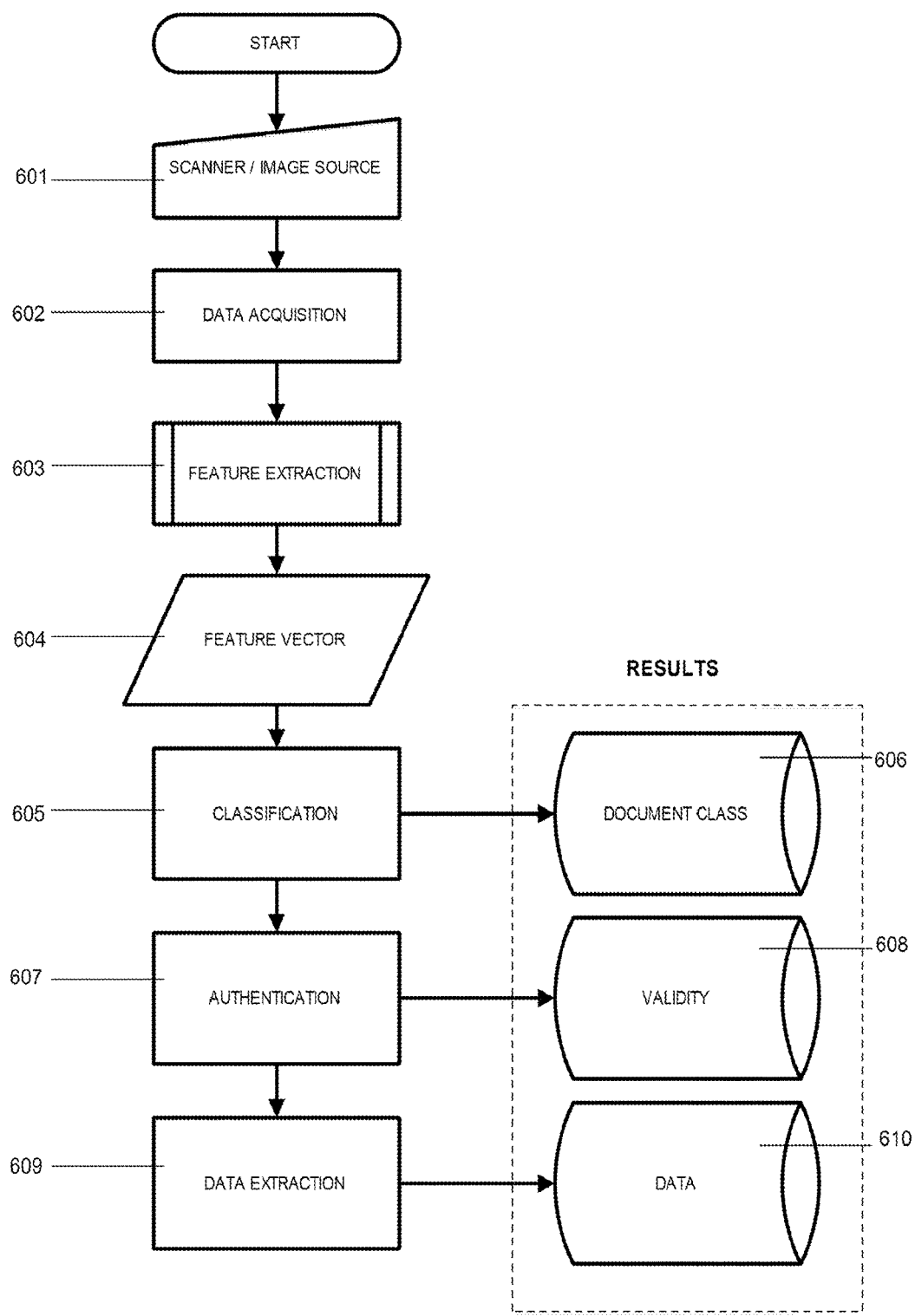
FIG. 6 provides a view of an overall flow for the Analysis Phase which includes Classification, Authentication and Data Extraction.

The solution taught by the Invention consists of two major phases—a Training Phase (see FIG. 5) and an Analysis Phase (see FIG. 6). The Training Phase is completed ahead of any analysis from sample exemplars and does not need to be done in real time. It basically sets up the classification, authentication, and data extraction processes to be performed on a candidate document. The Analysis Phase utilizes the results of the Training Phase to analyze an unknown candidate document and performs Classification, Authentication, and Data Extraction processes on it.

Generally, it should be understood that unless otherwise noted, the steps contemplated herein are intended to be carried out by a computer whenever possible. Indeed, most of the steps described herein would be impractical to perform without a computer. The computer may be any device having a memory, processor, and some sort of input and/or output interface—either currently known or developed in the future. Non-limiting examples of computers contemplated herein include desktop computers, laptops, servers, mobile devices, tablet computers, and the like. In many embodiments, and as described herein, the computer may have a specifically configured input device to receive inputs such as a scanner, camera, or the like for reading and analyzing identification documents. Moreover, the present invention may further comprise a computer containing one or a plurality of non-transitory computer readable media configured to instruct the computer to carry out the steps described herein. The term non-transitory computer-readable media comprises all computer-readable media except for a transitory, propagating signal.

During the Training Phase (see FIG. 5), the Training System utilizes exemplars of each class to be recognized and selects features to be used to build a number of modules, based on Pairwise Comparator Nodal Networks (PCNNs) to do the classification, authentication and data extraction. Training is required as the first phase for delivery of the solution. Because it functions "offline" prior to examination of any Candidate Document (CD), there are no constraints on requirements for processing power, memory or storage. First, a Scanner (or other means), 501, is used to assemble a Sample Collection, 502, which consists of document sample images and other characteristics. These collections from a given sample are sorted into a set of Document Classes (DC). A Feature Extraction step, 503, makes a set of measurements on the sample data and stores a Feature Vector (FV). From the FVs is derived a subset of features for that Document Class (Derive Document Class Features), 504. Next a set of inter-class features is derived (Derive Inter-class Features), 505, which are the subset of features that would be used to distinguish a given pair of Document Classes. An initial Class Ordering, 506, is done based on class frequency, geographic considerations, or other factors. From these, Classification Training, 507, can be done to derive a PCNN based network to be used for classifying documents. Next Authentication Training, 508, is done to utilize feature sets that distinguish real from questionable documents. In the Data Extraction Training method, 509, parameters are computed for use in processes which derive data from the document. Finally, the combined results for the Training Phase are stored as Composite Feature Vectors for each Document Class, 510.

In the Analysis Phase (FIG. 6), Classification, Authentication, and Data Extraction systems use the information derived from the Training Phase (FIG. 5) to analyze a Candidate Document. The methods used by each of these systems are essentially the same at an overview level. First, a Scanner (or other means), 601, is used to capture Candidate Document images. These images and any machine-readable properties are then available for Data Acquisition, 602. Next a Feature Extraction method, 603, makes a set of measurements on the sample data and stores a Feature Vector (FV), 604. A Classification method, 605, uses the candidate FV as the input to a process based on PCNNs to identify the actual Document Class, 606. Once classified, an Authentication method, 607, uses additional properties contained in the candidate FV to determine if the Candidate Document matches sufficiently with the known characteristics of the identified Document Class and, thereby, makes a determination of Validity, 608, (e.g. real, fake, altered, or a risk score). Then a Data Extraction method, 609, applies procedures to extract Data, 610, from the document image and from its machine-readable data sources such as printed text, barcodes, magnetic stripe, embedded chips or other means. This Data is then available to external processes to validate the bearer, record/log the transaction, or determine the rights/privileges granted by the document.

Training Phase
Sample Collection Process

Figure 7:
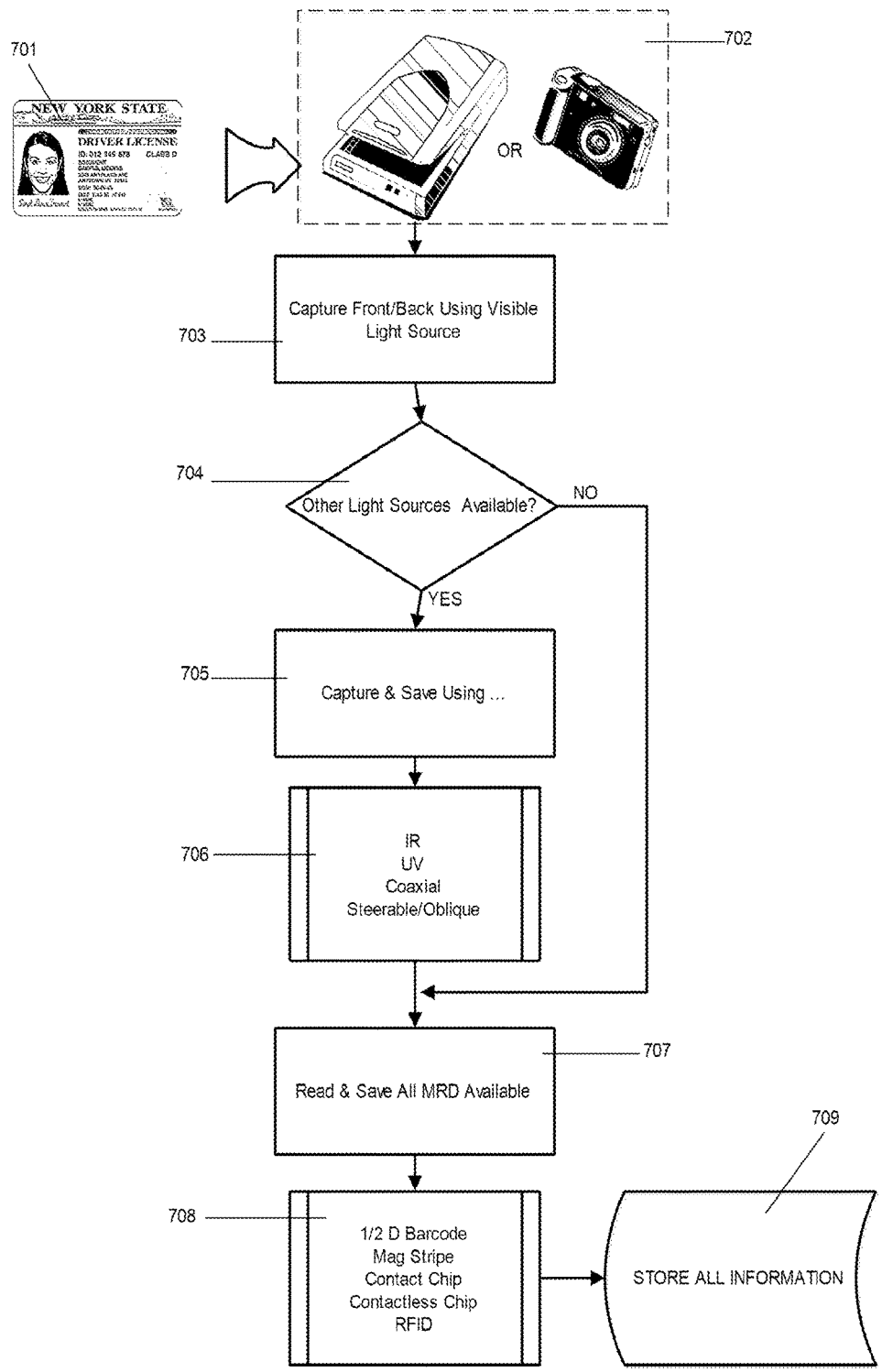
FIG. 7 provides a view of a general flow for image and data acquisition.

The first step in training is to collect representative image and data samples (if available) for each Document Class (see Image/Data Acquisition, FIG. 7). Information in various images can be extracted from a physical ID, 701, that is presented depending on the equipment at hand. Typically an ID is inserted in some type of scanner/reader/camera device, 702, which will produce a set of images of the document of one or both sides (or even edge) of the document in visible light, 703. If other lighting conditions are possible (UV, IR, etc.), 704, then capture and save, 705, these as well, 706. Any Machine Readable Data (MRD) that might be available is captured, 707, as well and saved, 708. All images/data is stored for processing later, 709. This collection process is the same as used for capturing the Candidate Document information in the as Analysis Phase.

Figure 8:
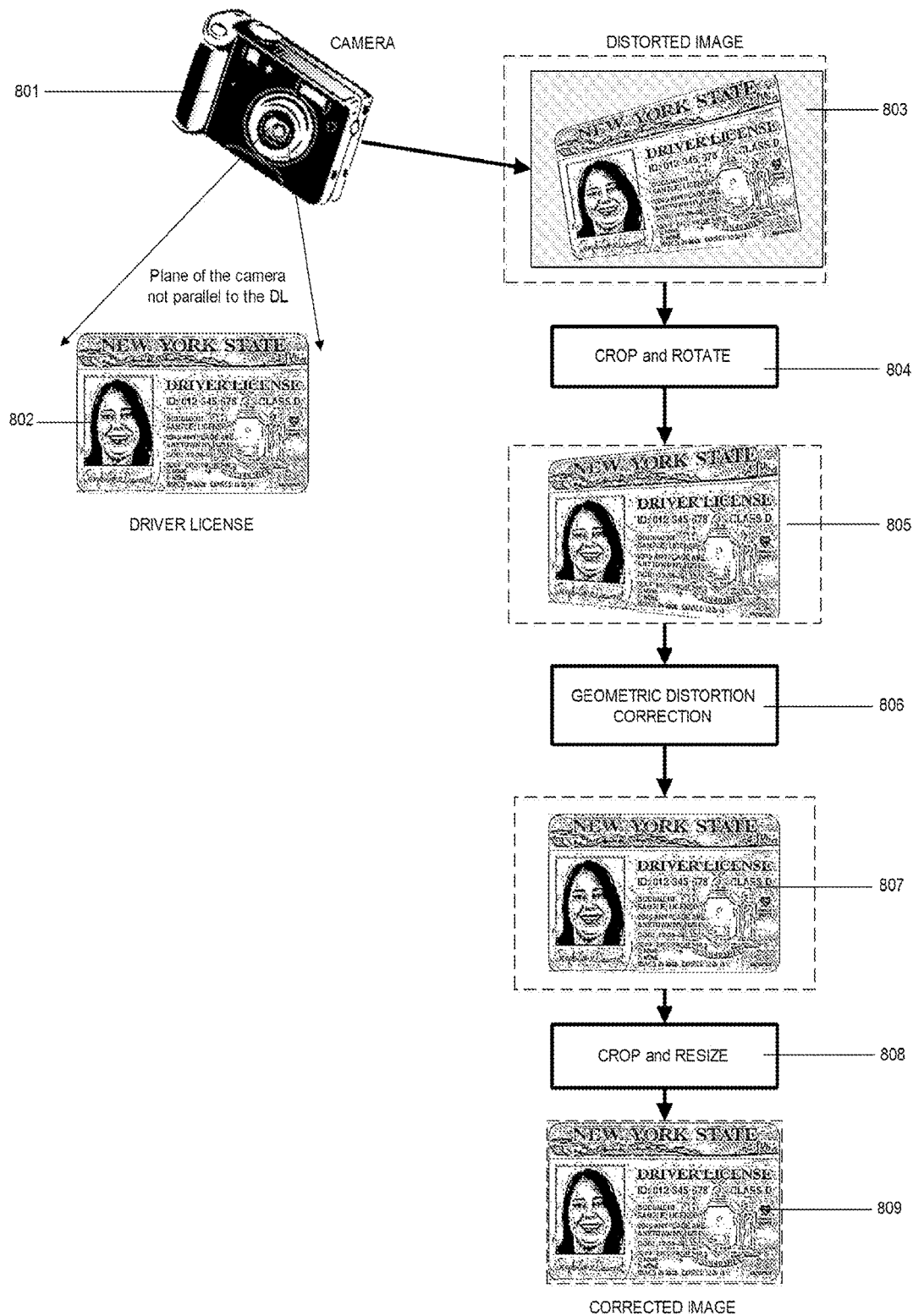
FIG. 8 provides a view of a process for correcting geometric distortion from unconstrained image capture.

During training and classification, there is the assumption that information collected during the Image/Data Acquisition process is compatible with, or at least a subset of, the original Sample Collection sources. Some preprocessing of the images might be necessary to derive a normalized image of a document. See FIG. 8. For instance, a camera based scanner, 801, might take a picture of an ID document, 802. Based on the orientation to and distance from the digital camera, the ID image, 803, may have to be cropped and rotated, 804, to yield another image, 805, and then other image processing transformations applied to correct for geometric distortion, 806, in order to obtain a standard rectangular size and orthogonal representation of the ID, 807. A final crop and resizing, 808, may be necessary to obtain a standardized resolution and sized image, 809, which will be used for training purposes.

Figure 9:
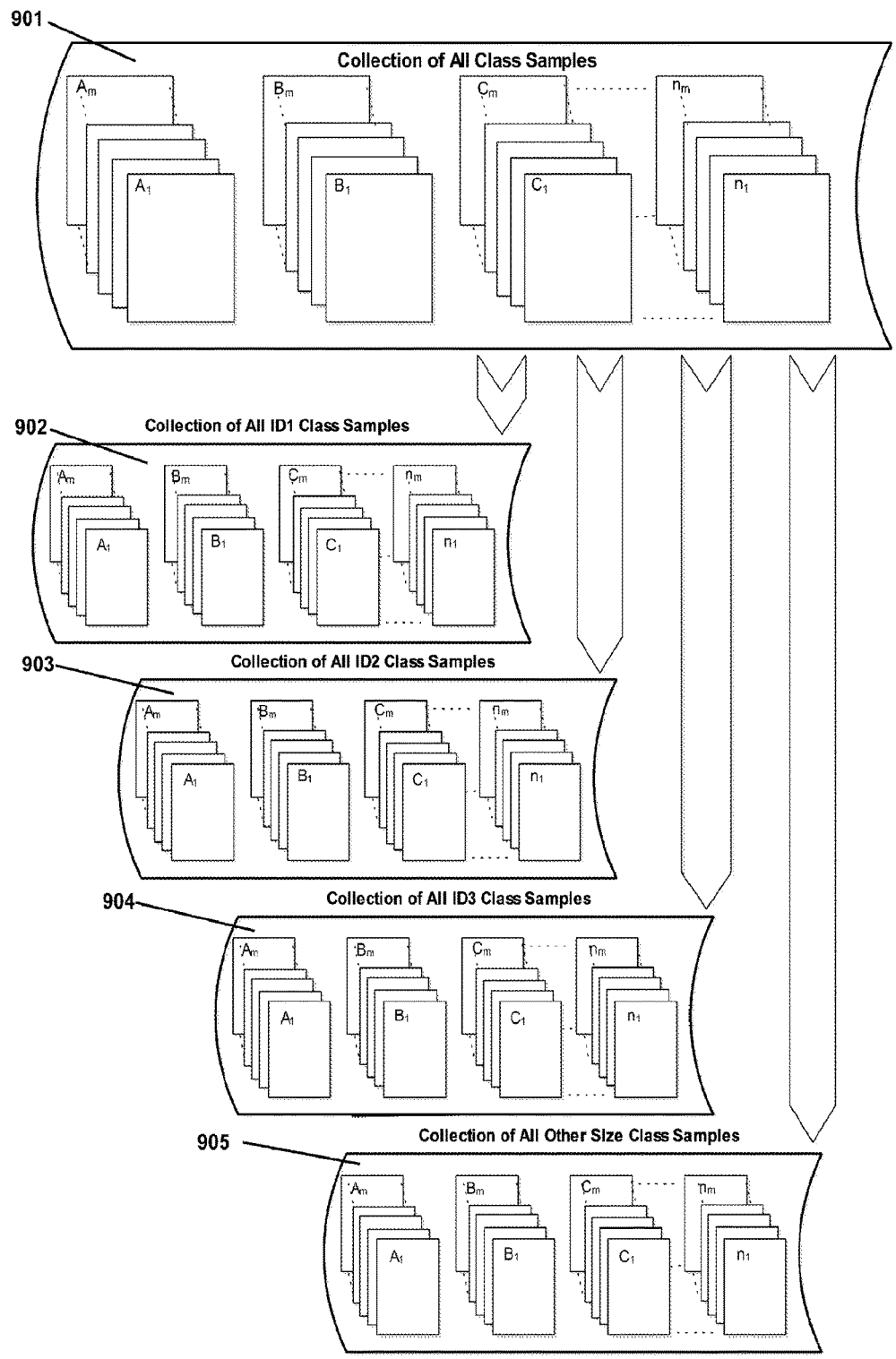
FIG. 9 provides a view of a sorting of Sample Collection by document size.
Figure 10:
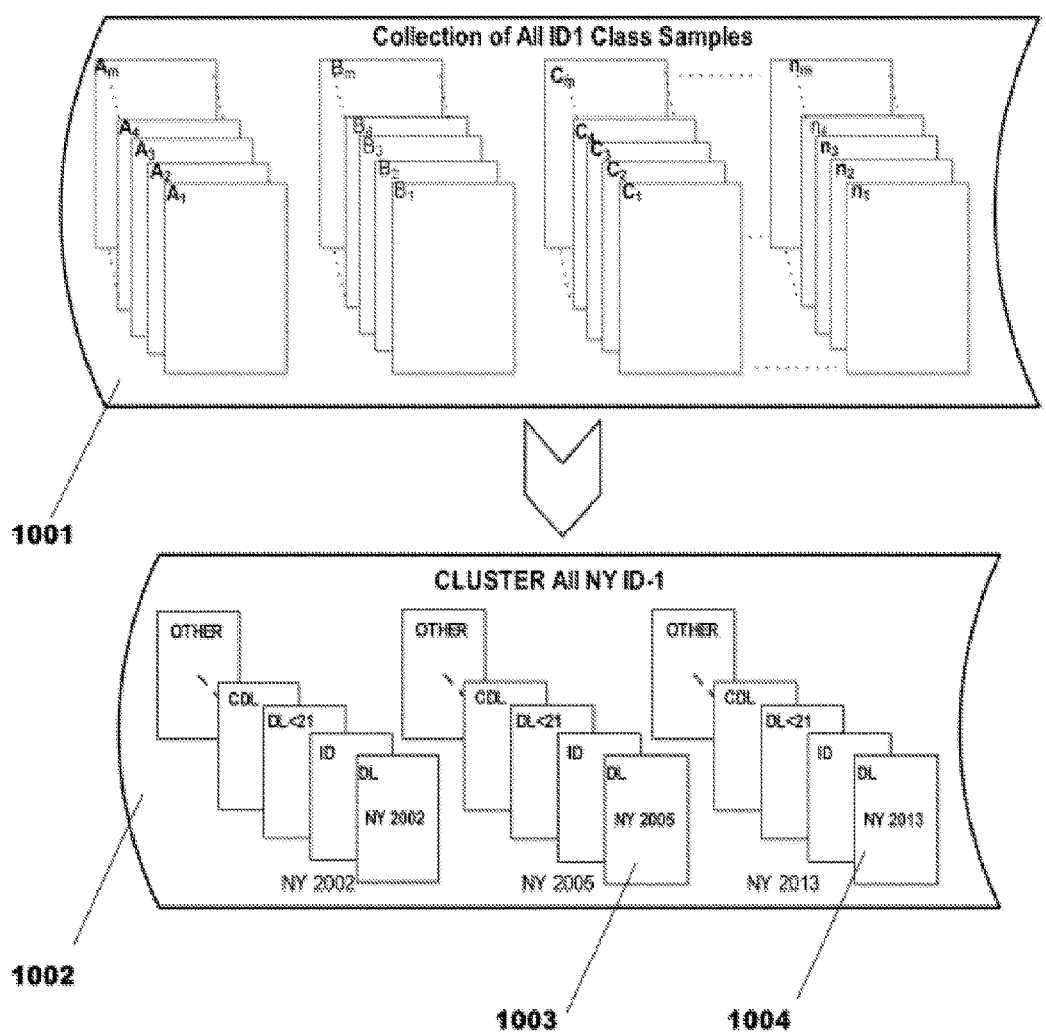
FIG. 10 provides a view of a further sorting of samples of the same size by Issuer.

In the training phase, these document samples are sorted into classes such as standard size categories (See FIG. 9). A first sort of all class samples, 901, may be according to the size of the document into standard size categories such as the ICAO Document 9303 categories of ID-1 (driver's license size), 902, ID-2, 903, ID-3 (passport size), 904, and all other sizes, 905.

In the case of all ID-1 type documents (i.e. driver's license/credit card size), 1001, they might be further sorted by issuer (state, agency, organization . . . ), 1002, and clustered. Further sorts might include by issue (year of issue, revision . . . ), 1003, and by type within the issue (Driver's License—DL, Identification—ID, Learner's Permit—LP, etc.), 1004. The goal is to get sample sets of documents, each belonging to a particular distinctive class. An example category might be genuine New York ID cards that were initially issued in 2005, which might be designated "NY-2005-ID-R" (where G indicates Genuine).

A related aspect of the invention is the collection of samples of fake documents if they are available. In many cases a given forgery source provides a significant percentage of the fake IDs that are used. This results in certain types of fakes being quite common. Any known fake ID samples of a particular type are given their own classification and features profiled in the same manner as true IDs. A collection of fakes for the example above might be designated "NY-2005-ID-F" (where F indicates Fake). These document classes are used in the authentication stage.

Training System

Figure 11:
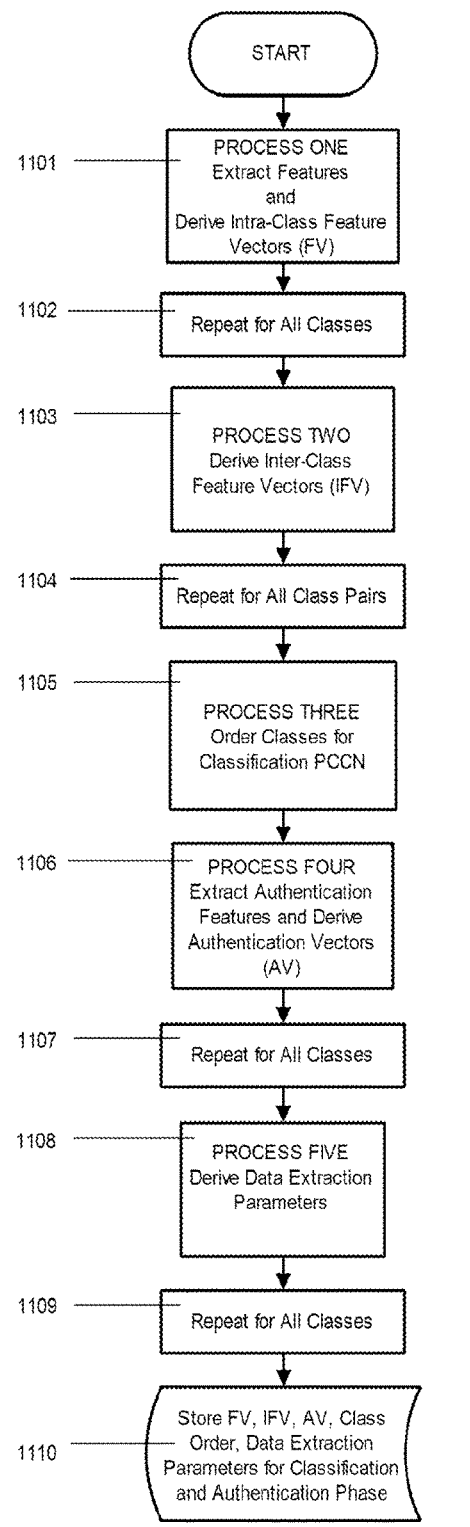
FIG. 11 provides a view of a various training system processes.

The Training System (see FIG. 11), utilizes the Sample Collection (SC) to derive the parameters that are used during the operational stages of Classification and Authentication. Training Process One, 1101, is the extraction all of the required features from each document class to build their robust and unique Intra-Class Feature Vector (FV). This process is repeated for all Document Classes, 1102. Process Two, 1103, uses the inter-class FVs to derive Inter-Class FVs (IFV) to give maximum differentiation between pairs of document classes that will be used at nodes in the PCNN for classification of the Candidate Document (CD). This process is repeated for all class pairs, 1104. Process Three, 1105, builds the array structure (Class Order) for the PCNN and, thereby, helps optimize the path that will be followed in the Classification process. Process Four, 1106, utilizes the FV for each class to derive the properties for the Authentication Vector (AV) that will be used during Authentication for validation of the Candidate Document. This process is repeated for all Document Classes, 1107. Process Five, 1108, utilizes statistical data developed during FV derivation process, image processing routines, and "intelligent agents" to augment operator interaction in setting parameters for Data Extraction. This process is repeated for all Document Classes, 1109. The derived results of these processes, FV, IFV, AV, Class Order, and Data Extraction Parameters are stored, 1110, for later use in the Analysis Phase involving Classification, Authentication and Data Extraction.

Feature Extraction

From the raw data sets, a set of features is defined and extracted for each sample. Features are typically some sort of a measurement derived from the raw sample data, usually expressed as sets of numeric values, Boolean values, or textual information. These could consist of overall physical properties of an image, such as width or height, or derived properties such as the average luminance, average hue, or maximum intensity. They could also be the result of statistical calculations, such as a histogram or standard deviation of a measurement parameter. These, over various sectors of an image, are potentially strong discriminators.

Figure 12:
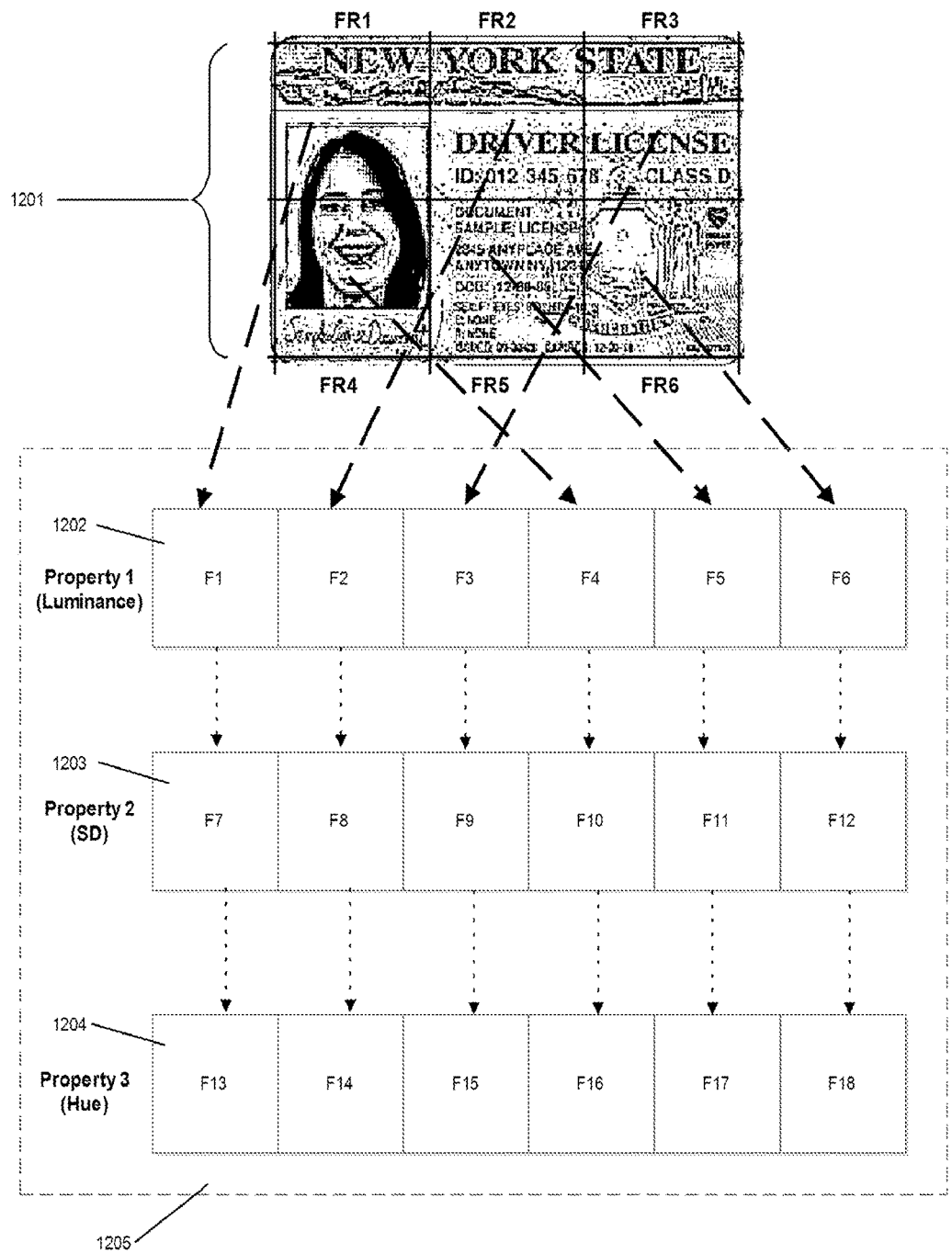
FIG. 12 provides a view of an exemplary multi-mode feature vector.

It is advantageous for an automatic self-learning method if multiple samples of each class are available so that accurate statistics on the variability of regions in the document class can be obtained. For illustrative understanding, the feature data shown in FIG. 12 is derived from taking an image of the ID and dividing the image into sub-regions in the form of a grid of Feature Regions (FRs). In the simple case of a 2×3 grid (6 regions), 1201, properties, such as luminance, 1202, standard deviation (SD), 1203, and hue, 1204, can be calculated for each sample. Hence, a Multi-mode FV (MFV) with 18 nodes (3 features from each of 6 regions) is created, 1205. This process is then repeated for all samples in the class.

Figure 13:
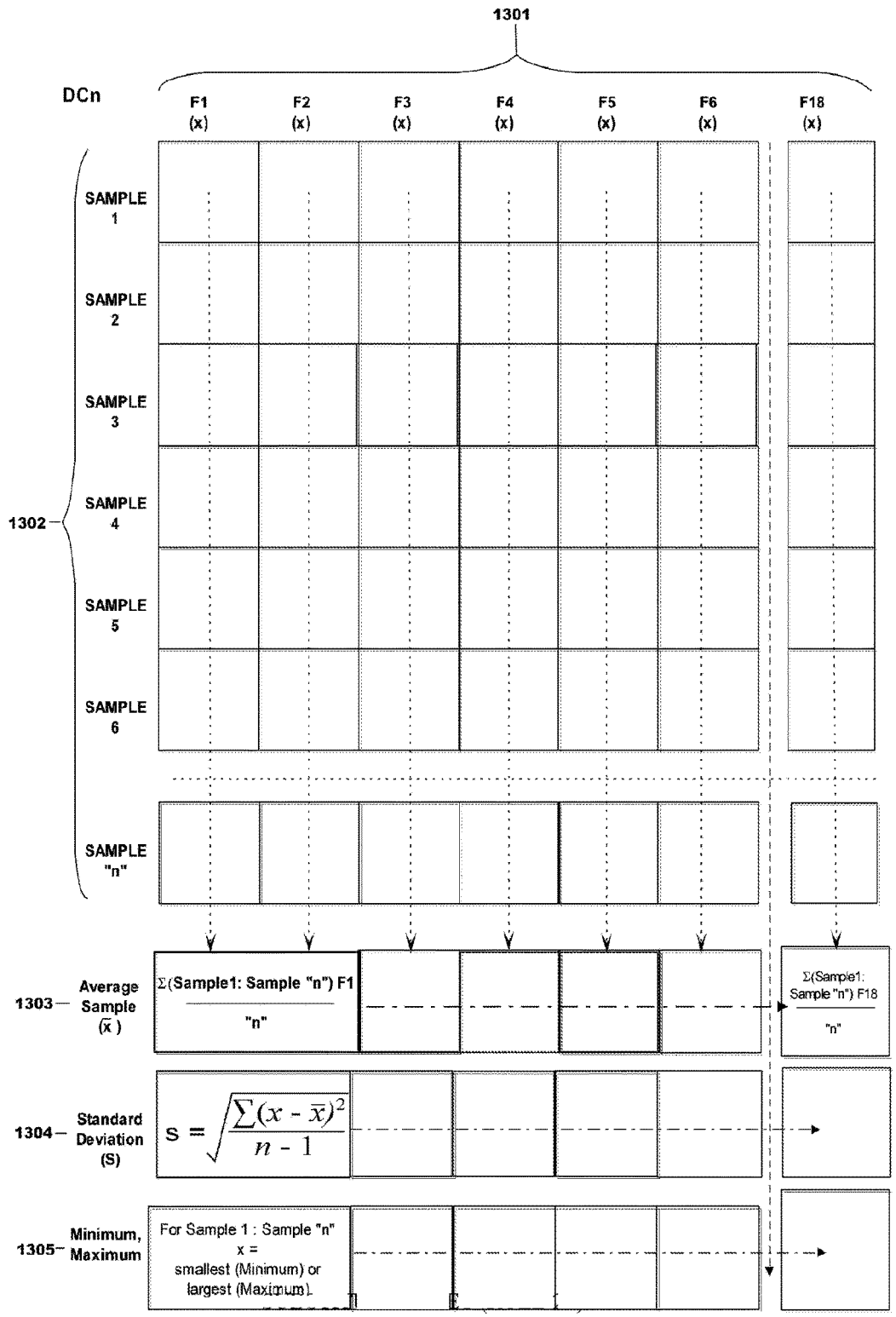

In order to evaluate the consistency of the feature and establish the range of values that is to be expected for each property, statistics are calculated (See FIG. 13) for each of the 18 feature elements, 1301, from the data values for all samples. Statistics that are calculated include Average, 1302, Standard Deviation, 1303, and Minimum, Maximum, 1304.

Figure 14:
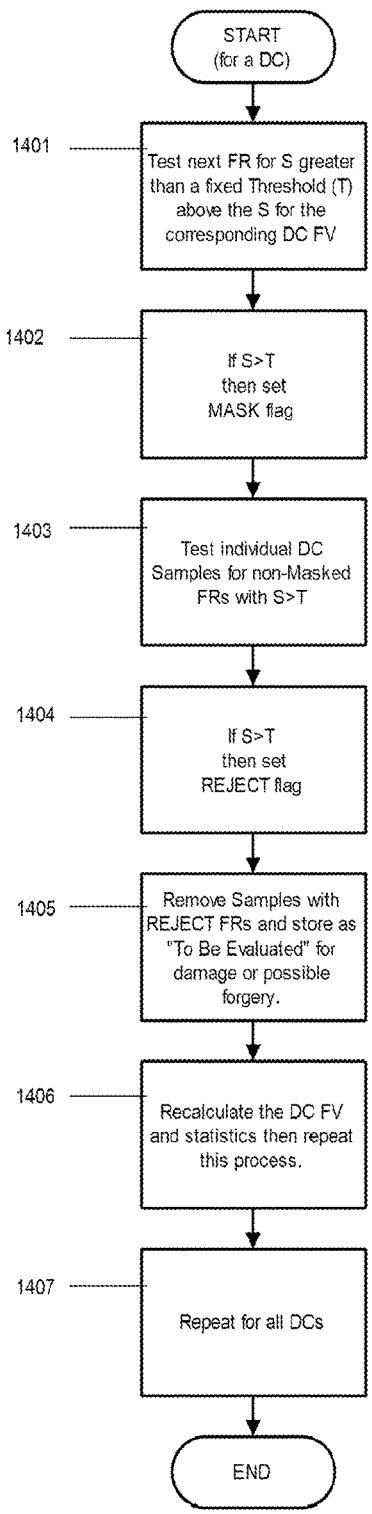
FIG. 14 provides a view of a use of statistics for removing bad samples from Sample Collection.

These statistics are used to identify common regions that are not suitable for classification or authentication (See FIG. 14) due to the presence of variable data (of value later for the Data Extraction method), 1401, 1402, or to the presence of repeated wear/damage 1403, 1404. In instances where a specific sample has region(s) which substantially exceed the standard deviation for the like region for the class, the sample will be removed from the collection and judged as a badly deteriorated or fake, 1405. Statistics are then recalculated for the sample set, 1406. The class regional statistics can be added to later with additional sample information in order to improve the training and performance over time. The process is repeated for all Document Classes, 1407.

Figure 15:
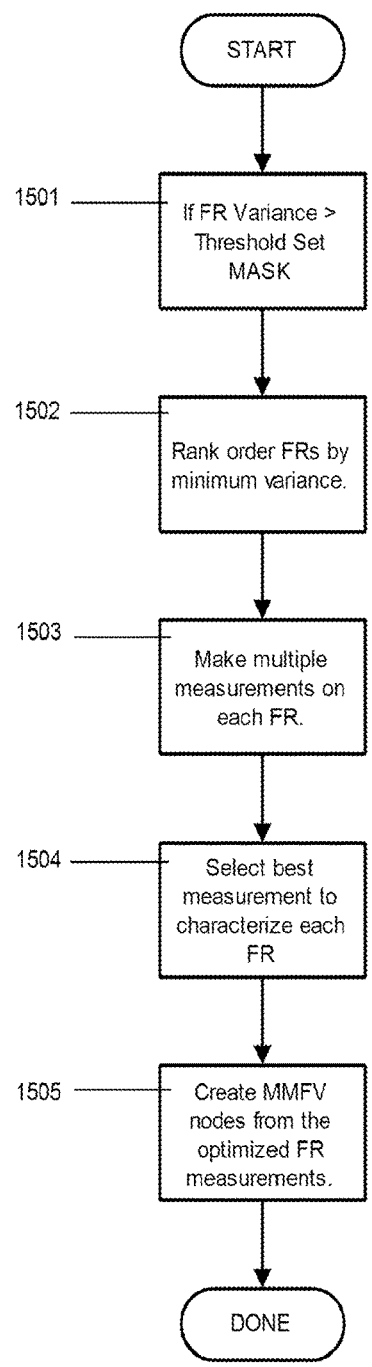
FIG. 15 provides a view of an exemplary ordering of feature regions according to their consistent values.

See FIG. 15. The statistics are then used to rank the consistency of the contents of the FRs, 1501. This statistical information alone is a reasonable basis for comparison of Document Classes to each other. One could compute the statistical properties or simply the average luminance in each FR as a 6 element Feature Vector (FV) with a MASK flag set for nodes which exceed the variability limit, 1502. However, not all FRs are best characterized by a single measurement type, 1503. Each FR has multiple measurements applied that consider such regional properties as brightness, color, line content, shading, and the statistical properties of any of these properties over the region, 1504. Therefore, the Invention teaches the core concept of a Multi-mode Feature Vector (MFV), 1505.

Method to Derive Class Feature Vectors

In order to derive a representative feature vector (FV) for each class a complete set of measurements for all FRs needs to be derived and stored. The number of regions to be measured and the types of tests to be performed are defined by the general characteristics of the Document Class. In the case of an ID-1 sized document (85.60×53.98 mm, 3.370× 2.125 in), the assumption is that the smallest full region for classification is the largest variable data element, i.e. 12-point type (⅙" or 4.23 mm). Similarly for authentication the smallest region would be the smallest artifact to be identified, i.e. 2-point microtext (1/36" or 0.71 mm). Therefore, given allowances for border deterioration, a 12×19 grid (240 regions) would meet this classification requirement and a 5×5 grid within each FR would meet the authentication criteria. If a 600 dpi scanner is used to image the ID, each FR for classification would be 100×100 pixels and each Authentication Region (AR) would be 20×20 pixels.

This may seem like a large number of FV elements to be processed. However, the Training System is designed to optimize the performance, memory, and storage requirements. The number of features used has a direct impact on processing speed and memory. However, enough features are required to get good discriminability. The number of features to be used can be determined empirically.

Using the methods taught herein, an estimated maximum of 3-7 FRs and 6-20 elements in the FV per document class are all that are necessary for inter-class comparison nodes in the Classification PCNN. Also, approximately 6-10 nodes are needed for the corresponding Authentication Vector (AV) to prove Validity.

Figure 16:
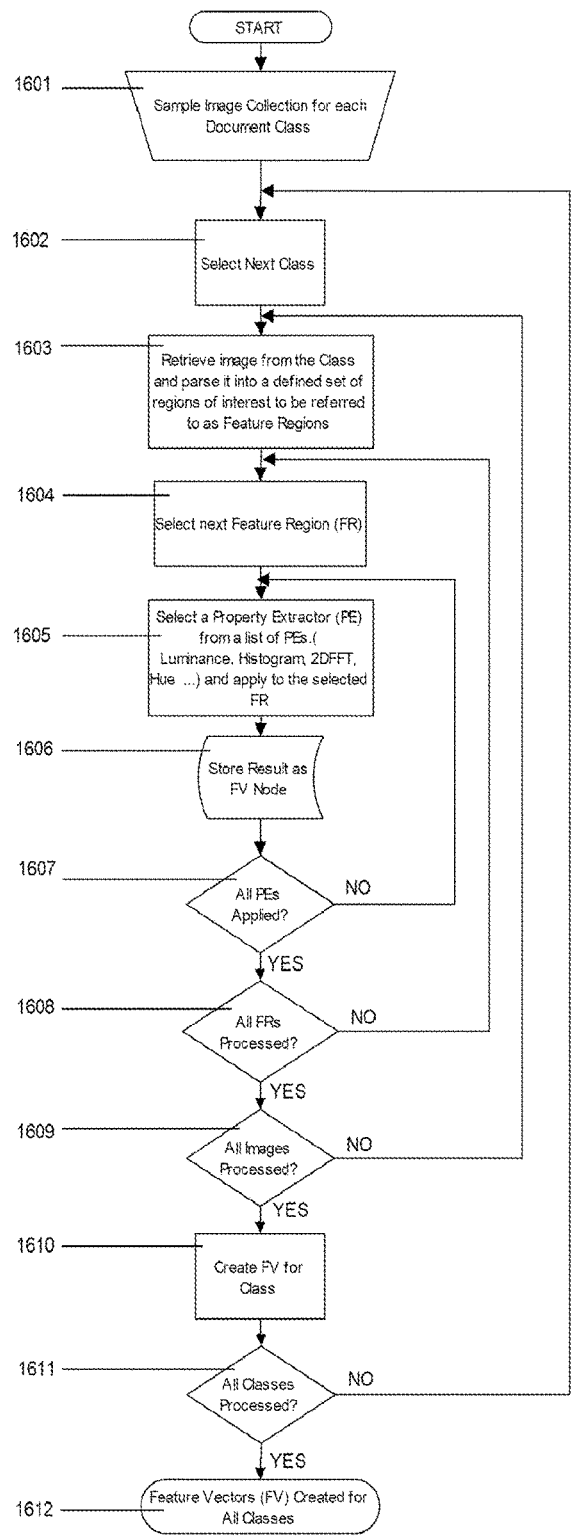
FIG. 16 provides a view of a core Training Process for feature extraction.

The overall process for creation of all the FVs is illustrated in the flow diagram FIG. 16 (Training Process—Feature Extraction.) Once a Sample Collection is available, 1601, the process begins with selection of a Document Class to be trained, 1602. Then the first sample from that DC is parsed into FRs according to the criteria above, 1603. The first FR in this sample is processed with a set of Property Extractors (PEs), 1604, 1605. The PEs are measurements with normalized result values that are weighted according to their discrimination ability vs. the processing requirements. The results are stored as the FV for that sample, 1606; when all properties are extracted, 1607, the remainder of the FRs go through the same steps, 1608. Once all samples for the DC are processed, 1609, the next phase is the creation of a DC FV based on the properties that have been extracted for each sample, 1610. This process continues, 1611, until a FV has been created for each of the DCs, 1612.

In the case of IDs, these represent the standard base ID image. Within a class, there will be certain regions and features therein that will exhibit very little change from one sample to another. The average Feature Vector for a class can be derived by averaging each of feature components across all samples (see FIG. 13). As part of this process, variability can be determined by calculating the standard deviation (SD) for each feature component. This variance factor is used in later processes to help determine whether or not to use that particular feature for comparison tests.

Figure 17:
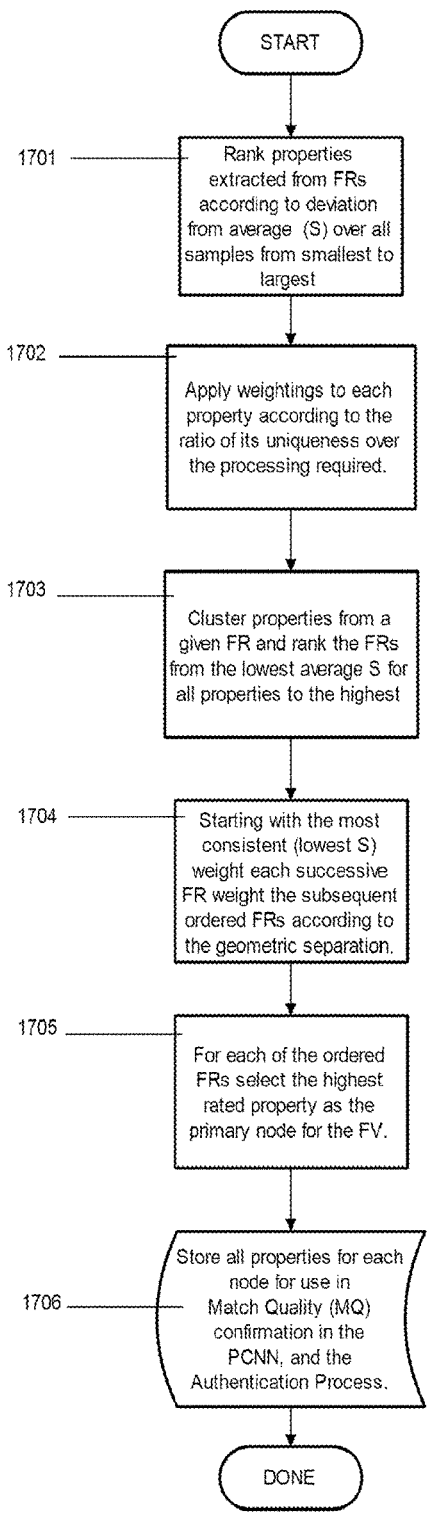
FIG. 17 provides a view of a process for selection of Intra-class feature vector properties.

The next process in the Training System is to derive a modified feature vector, the values of the feature for that class, as well as a variability marker for that feature. See FIG. 17. In some cases, this variability marker could be a Boolean or it could be saved on a standardized scale indicating degree of variability. Variability above a set degree will result in setting a MASK flag for the region. As noted earlier, Masked FRs from either class are excluded from the derivation of the Inter-class FV (IFV) for a given node.

Intra-class FV properties will be rank ordered as inputs to the selection process used to derive the final FV per class pair for inter-class comparisons in the PCNN. In addition to invariance, 1701, weighting is given to the amount of information represented by the measurement, 1702, and a dispersion factor which weighs geometric separation to allow for localized wear, damage, or manufacturing variations, 1703, 1704 and the property which best characterizes that FR, 1705. Hence the Document Class Feature Vector will have many properties (FRs) saved, but only a limited number are used for class confirmation in the PCNN, the authentication process, or the derivation of the each Inter-class Feature Vector (IFV), 1706. It is important to note that this entire process is automated. Anytime there is more sample data for a Document Class available, the individual class feature vector and Inter-class Feature Vectors are automatically recalculated.

Method to Derive Inter-Class Feature Vectors (IFVs)

The invention, in large part, is based on an "intelligent" pairwise comparison between classes as implemented in a Pairwise Comparator Nodal Network (PCNN). The method for doing an optimal discrimination between only two classes at a time and assessing the quality of the match to either class results in a large boost in performance and a large reduction in required computational resources. This is the basic process within a node of a PCNN.

Figure 18:
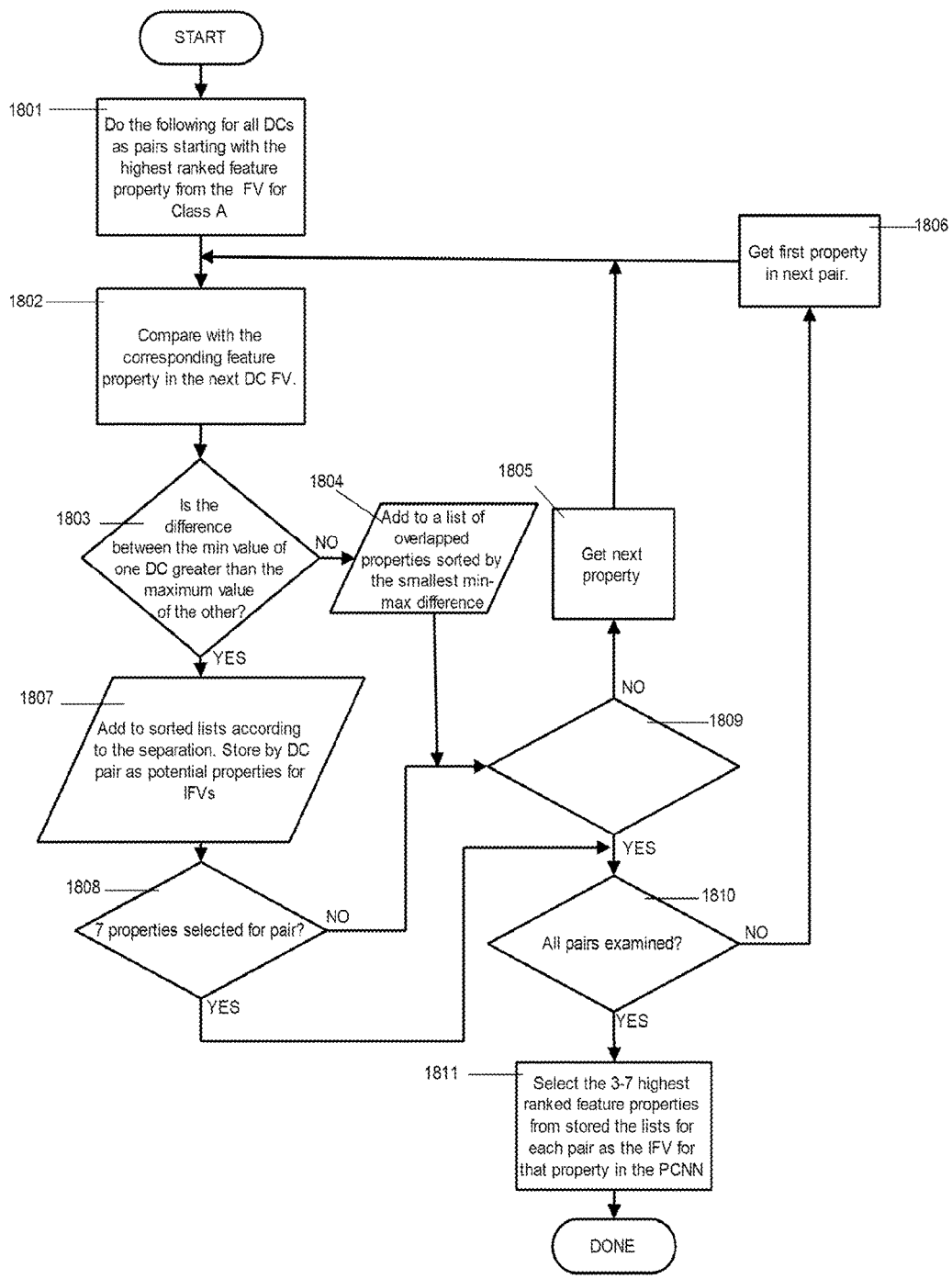
FIG. 18 provides a view of a process for selection of inter-class feature vector properties.

There are many ways to discriminate between two classes based on feature vectors. This is standard pattern recognition theory. One could potentially develop a neural network or Support Vector Machine (SVM) to utilize a set of training data samples to optimally discriminate between two classes. In addition, one could also develop a Semantic network to look for symbolic relationships between data samples to further optimally discriminate between two classes. Here we describe an alternate simple approach. For each pair of document classes we must select the FRs to be compared. See FIG. 18. Assume that we wish to compare Class A to Class B. We take the Feature Vector for Class A but only considering features that are not marked as too variable. We also take the Feature Vector for Class B but only considering features that are not marked as too variable. Now only consider the features that are common to both, i.e., those features that are not highly variable in either class.

This is done by ranking the FRs according to their joint regional variance score, i.e. looking for the same FR in both FVs that has the lowest average variance, 1801. Any FR which is masked in either class is excluded. In order of FR ranking, the highest rated property for each of the two classes are compared, 1802. The properties with a minimum value for one DC greater than the maximum value for the other are accepted, 1803. They are added to a list sorted by the magnitude of this difference, 1807. This comparison is repeated for all FV properties in order to evaluate all of the properties for the class pair, 1809, 1805. The properties overlapping min-max values are saved separately and sorted according to the least overlap, 1804. It is estimated that seven (7) non-overlapped properties or less need to be saved in the non-overlapped list, 1808. If there are seven non-overlapped nodes, the overlapped list may be discarded. It is possible that a property that is most stable in the FR for one class has a high variance in the other. This means that the threshold point that differentiates the two features is not as sharply defined. Therefore, better separation may come from a property that is not the most invariant in either class, but from a property that is stable in both classes and has the greatest difference score. The process is repeated for all nodes in the PCNN, 1810, 1806. The nodes in the ICF will be determined from the ranked feature lists using first the non-overlapped and then the overlapped list until the seven best IFV properties are determined, 1811. If there are three or more non-overlapped properties for a PCNN pair, then the IFV may be truncated to just three properties. Conceptually, further optimization can be used to reduce the PCNN to a single property if there is a very large difference; however, the benefit of the TMQ comparison is reduced because the probability of a match to either DC would then be based on a single property comparison. Analysis for the processing time benefit of the reduction in the number of properties, versus the preemptive determination of the DC, is done for each PCNN node.

Figure 19A:
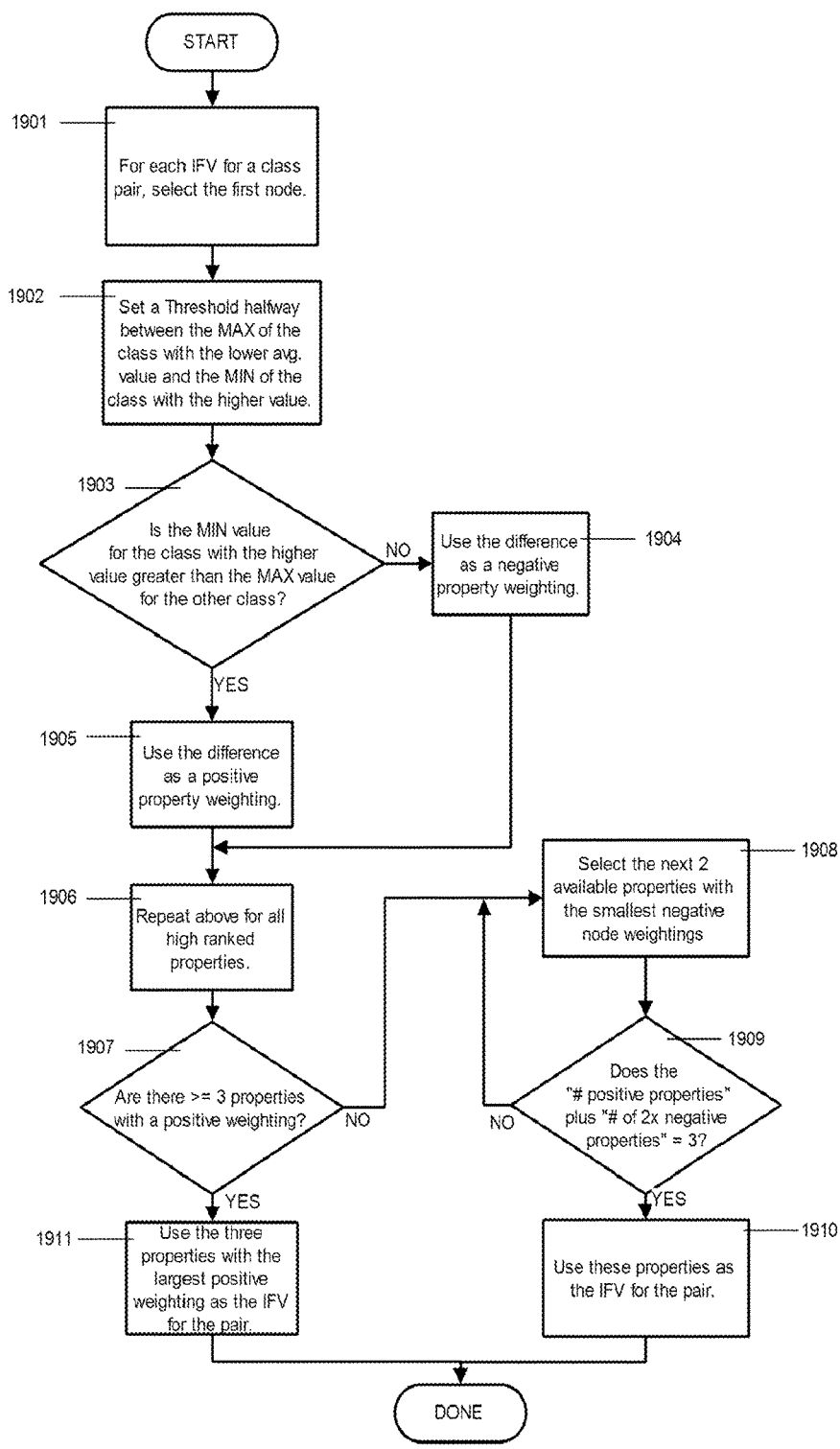
FIG. 19A provides a view of a process for optimizing nodes.

The objective is to find the set of features (properties) that provide maximum reliable discriminability between the two classes. See FIG. 19A. Once the set of FRs and features (i.e. IFV nodes) that exhibit the most differences between Class A and Class B are derived, 1901; this could simply be considered calculating a difference feature vector between Class A and Class B, 1902-1906. The features are then rank ordered according to magnitude of difference, 1903. A fixed number of features (e.g. the top 5 most different features) or just those features that exceed a certain threshold of difference can be used.

However, optimization of the discrimination between classes with the fewest properties can be achieved by intelligently selecting the combination of properties which take into account the overall characteristics of the document type as well as the common regions for comparison. As with calculation of the FV above, the IFV is constructed by selecting the "best" FR (i.e. highest ranked property), 1907, and ordering subsequent ranked properties weighted by their geometric separation. The definition of a pairwise node for the PCNN is basically a list of the features (IFV) that should be used to discriminate the two classes being compared to the Candidate Document. The comparison decision at each node is not a simple A or B feature greater (tie goes to A). Due to variance factors in the feature extraction from each class, a threshold is established at which the probability of either class being wrongly chosen is minimal. This is the point where the probability curves for the feature measurements overlap. The maximal difference areas are where attention is focused in developing a pairwise node test, 1909-1911.

As a practical illustration (See FIG. 19B), in one type of ID (1912, Class A) the regions E1 and F1 are mostly white, and in the other ID (1913, Class B), the same region is mostly black. A very simple optimized nodal test would be to measure the grayscale color of the unknown only in the target areas E1 and F1. If the region is closer to white, have the node select Class A, while if closer to black, have it select Class B. Such a test is very simple computationally yet very powerful in telling Class A from Class B. If both areas on the Candidate Document are closer to white and match the values for Class A very closely, then a Test for Match Quality (TMQ) is run to check for an exact match. If they were both closer to black, then Class B is selected and, if very close to Class B, then a TMQ would be done for an exact match to Class B. If there is an inconclusive Boolean match, then the match score is used to determine the next pairwise comparison. Instead of utilizing a lot of features that have virtually no contribution to telling A from B, we focus just (or more) on the feature (or features) that are most useful.

Again, it should be note that this training process is automatically done ahead of time and the resultant optimal pairwise feature sets are automatically generated from sample data. Being able to do this automatically with a minimum number of calculations, and minimal data to compare becomes very important in a pairwise scheme since the number of pairwise comparisons needed climbs rapidly with the number of classes. For example, 20 classes requires 190 pairwise nodes, for a 100 classes there is need for 4950 nodes, and for 1000 classes, 499,500 nodes.

Class Ordering Method

The probability of occurrence of particular classes can be used to optimize performance in a Paired Comparator Nodal Network (PCNN). The classes should be arranged in order of most likely to match the Candidate Document. The order of classes can be maintained in a simple array which will be used as an input to the PCNN classifier stage for setting up the PCNN. (See FIGS. 20A, 20B, 20C)

In those instances where Machine Readable Data (MRD) is available, the issuer claimed by the Candidate Document may be identified almost immediately. See FIG. 20A. This creates an immediate path to a corresponding point in the PCNN array, 2001. However, this data generally does not include information which is sufficiently specific to allow exact classification or for reliable authentication. A PCNN is established for each Issuer based on the magnitude of the document type assumed to be in circulation, 2002. PCNN order is stored for precise classification of each issuer when a CD with MRD is presented, 2003. It should be noted that, in order for the MRD to be easily read, public standards are established which permit both the creation, alteration, and transfer of identity data with little chance of detection. Therefore, best practices are based on using the MRD and the physical features of the ID to classify and authenticate.

The class order could be set up initially based on the proximity of issuing jurisdictions (See FIG. 20B) to the location where the system will be used, 2004. Under this scenario, most IDs would be expected to come from the immediate geographical area where the system is being used. In one embodiment, this geographic determination may be based on geographic or location-based proximity to a projected area of operation, such as a physical, geographic, electronic, network, node or cloud location. For example, the order of ID classes from State/Provincial issuers could be set up by the shortest geographic distance to their capital. If the system is processing IDs from all over a country, then the order could also be adjusted according to the relative population of the issuers, 2005 and even further by the quantity of a specific ID type issued, 2006. If the examination location is not known, 2007, then the order is stored by issuer according to quantity of a particular DC, 2011. If the examination location is known, 2007, then the distances to issuers can be calculated, 2008. These are used to weight the DC clusters for all issuers, 2009. The results are stored and PCNN order is optimized, 2010. When the examination location is available, then the initial order has been predetermined.

Actual usage statistics, based on the frequency that Candidate Documents (CDs) match a particular DC, provide the best information for optimization of the Class Order. See FIG. 20C. The PCNN array, 2015, can periodically and automatically be reordered based on these statistics, 2012-2014. Depending on the distribution of IDs presented, there could be a very large reduction in the classification time relative to a random ordering of classes in the PCNN.

Training Method for Authentication

Figure 21B:
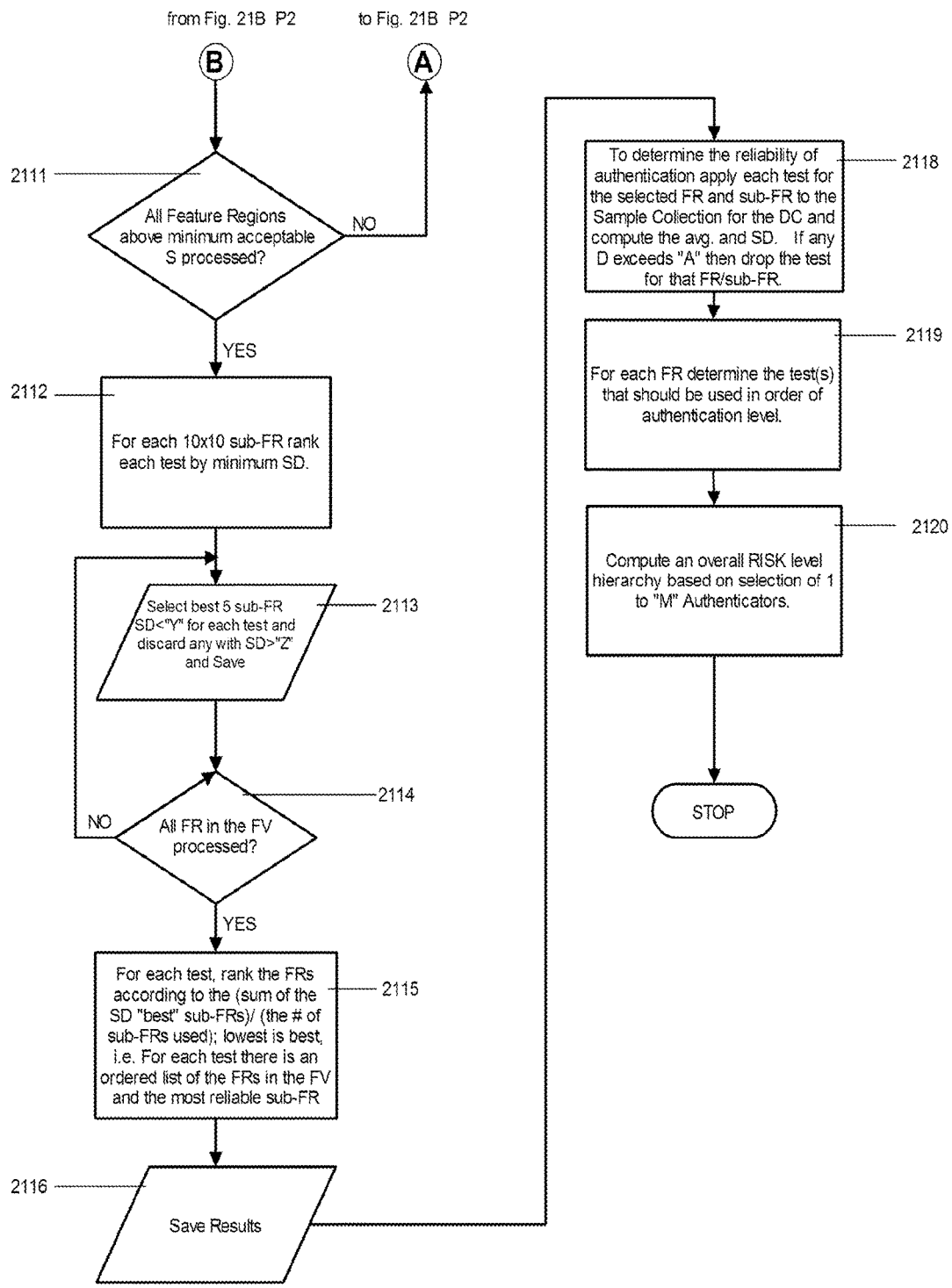
FIGS. 21A and B provide views of processes for selecting and training authentication feature properties.

Given that a determination has been made as to the class for a CD, then there is the question of how to determine if the CD is genuine or not. See FIGS. 21A, 21B. One of distinguishing properties of this invention is the ability to detect false documents. False documents may end up being identified as "Unknown" documents if they do not fit the characteristics of any of the legitimate classes closely enough. However in many cases, they will be classified as being a member of a given legitimate class. Then the question is how to distinguish these false documents from their real counterparts. Authentication Vectors (AVs) are a superset of the Feature Vectors used in the Classification process. An assumption is that, within the geometry of Feature Regions selected for classification, can be found the most reliable Authentication Regions. It may be necessary to locate anchor points and correct rotation/offset for some tests to be reliable.

This could range from simply additional properties of the selected region (such as a distribution of values versus simply an average value) or additional tests such as color, histogram, etc. It could also mean looking at a finer grid within the Feature Region using the same or additional tests. The finest geometry is at the pixel level, but realistically the smallest test region should be greater than the resolution of the coarsest image accepted.

For authentication purposes, the feature set collected could be the same as for first level analysis. Because there is only a single Authentication Vector (AV) for each DC and the authentication method only requires processing once after classification occurs, there are few constraints on processing time or storage. Therefore, a larger set of feature properties from the FV could be used to validate the CD. Alternatively it could be a different feature set which includes an image grid with finer resolution, 2101 and a select set of measurements with compound values, 2102-2105.

The authentication process computes the specified authentication features from the CD and calculates the weighted, normalized variances from the like average features for all samples in the DC, 2106-2110. Normalized variance is the ratio of the CD feature deviation to the average feature vector standard deviation. Weighting is based on the amount of information provided by the feature measurement, 2111-2120. The probability of authenticity is computed statistically by processing the individual variances.

In the instances where there have been known fakes identified for a DC, a separate Fake Class (FC) is created for each identifiable document creator. In many cases a single or limited number of samples may be available to establish the FC. There are two distinct differences to consider when evaluating a CD as potentially belonging to a FC or a regular DC. One FC may not classify as a regular DC. Secondly, it may not only classify as a DC, but it might have only subtle specific details that are recognizable.

Figure 22:
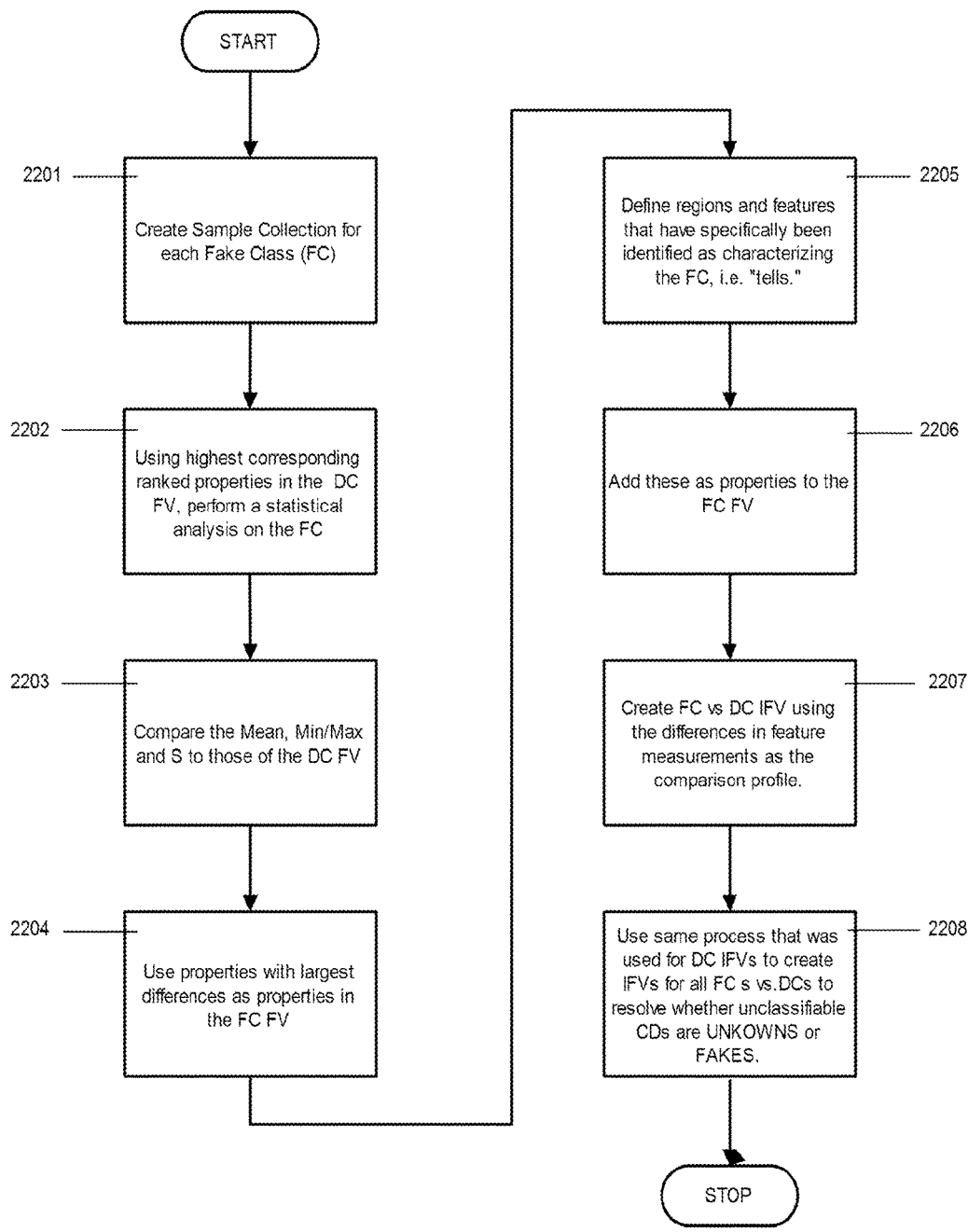
FIG. 22 provides a view of a process for training Fake Class.

Training a Fake Class is similar to training a DC except that there is limited information and, hence, few statistical properties to use. See FIG. 22. A Sample Collection of Fake documents is created as a mirror of the authentic DCs, 2201. If there is no like DC, i.e. fake issuer, then a unique collection is created. Because the claimed DC is known, then an Inter-class Feature Vector (IFV) (and/or AV) can be derived by comparison with the average FV for the DC, 2202-2208. Whether the final decision by the classification PCNN is a DC with known FCs associated or as an "Unknown," the first phase in the authentication method is framed in terms of the PCNN model. Each DC will have a limited number of associated FCs. Therefore, a very small PCNN will quickly determine if the CD is in fact a FC and not a DC. If the CD classifies as "Unknown," then the option exists to process the CD against all FCs to determine if it is a known FC. If the CD remains "Unknown" then it may be badly damaged or a new document type (fake or real). Those instances require a decision to train the CD or discard the results. All information from a successful classification is used to automatically update the FV for that class.

One of the features of the PCNN is that, out of each pairwise node, there are actually multiple pieces of information. One of these is a class decision—whether the input matches Class A or Class B better. The other piece of information is how well it matched the selected class (i.e. Match Quality). The quickest determination of likely validity is the comparison of how well the CD matched the "best" DC. When the MQ is compared to a threshold, if it is far off from the norm, the document would be classified, but categorized as likely forged or altered.

Training Method for Data Extraction

Figure 23A:
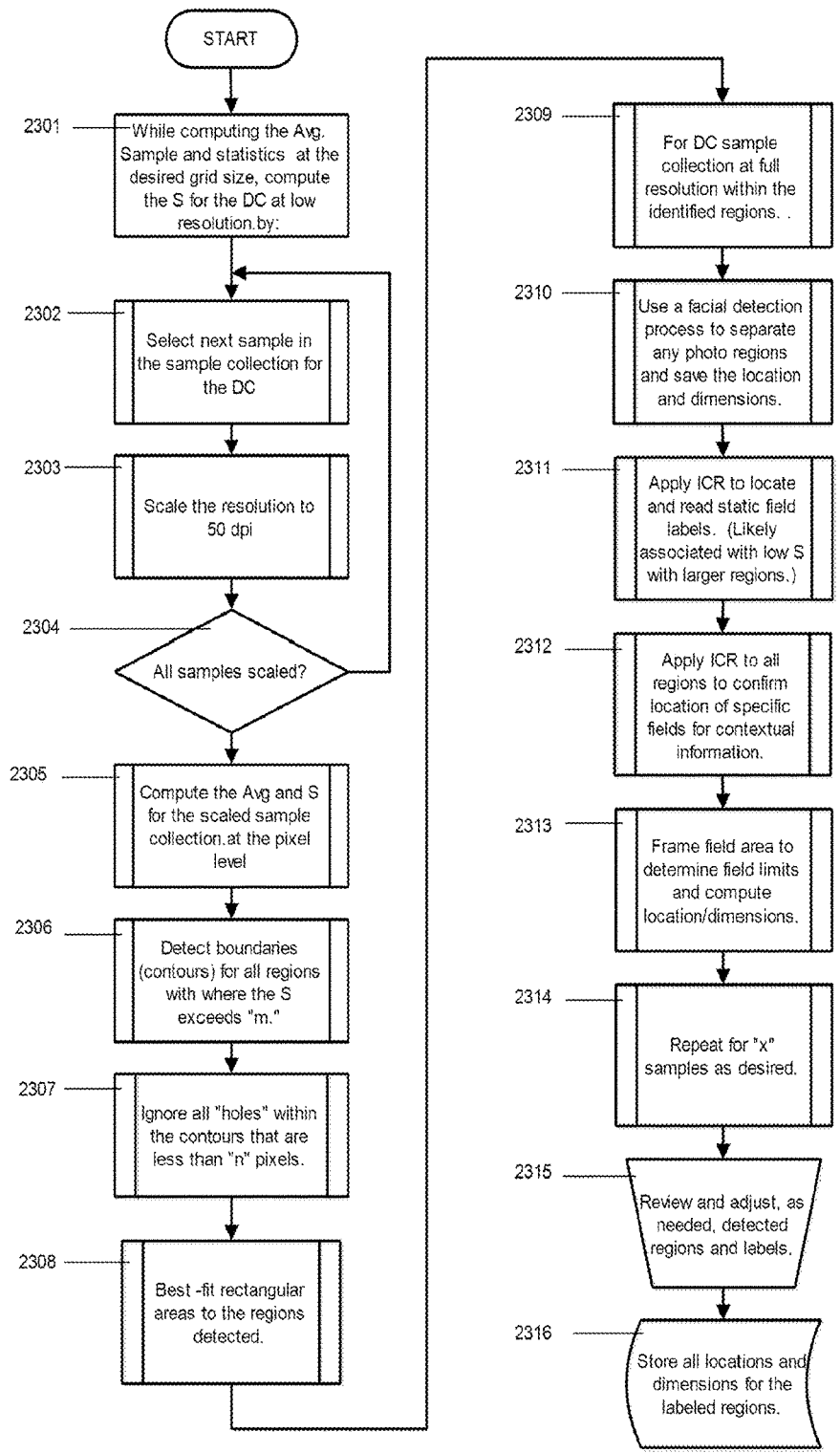
FIG. 23A provides a view of a process for automatically extracting data extraction region parameters.

Data Extraction requires knowledge of the information to be extracted. See FIG. 23A. This includes a label for each type, its format (text, date, numeric, barcode, photo, signature . . . ), and the location on the document where the information can be found. Because variable information on the document will not align precisely with a coarse grid as used for classification or to set regions for authentication, the data extraction areas are identified using low resolution versions of the sample images (e.g. 50 dpi vs. 600 dpi), 2301-2305. The regions on the document that have large average pixel luminance deviation (indication of variable information) are processed using image analysis such as "blob" identification or contour detection to separate static from variable areas, 2306-2308. The full resolution image within the variable areas, 2309, is processed using image processing tools such as facial recognition, OCR, pattern matching, and format matching that can automatically create zones and assign a Label from a defined set of likely information types, such as First Name, Last Name, Birth Date, Address, State, Zip Code, Photo, and ID Number, 2310-2315. Results are stored as a part of the DC descriptor, 2316.

Figure 23B:
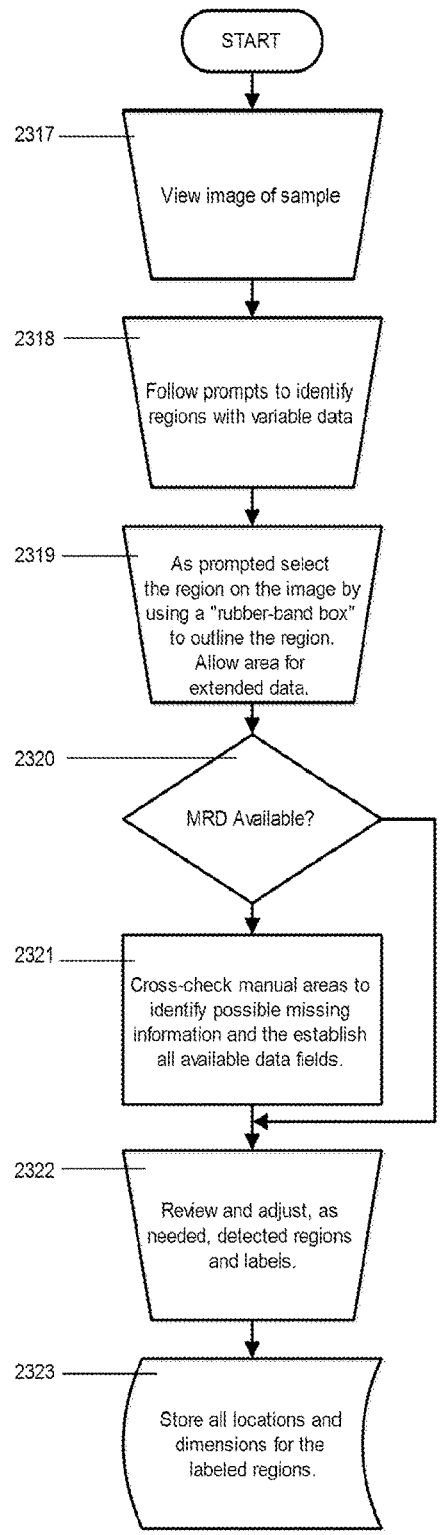
FIG. 23B provides a view of a process for semi-automatically extracting data extraction region parameters.

However, in many instances of initial sample collection, there may be a very limited number of documents to evaluate. See FIG. 23B, Semi-Automated Data Extraction Training. In these cases a semi-automatic or manual process is used. This involves either a an image processing step to identify likely information regions and operator viewing of the image to select the Label from a list; or, an operator with a pointing device and "rubber band box" graphic overlay software tool outlining an area and selecting the Label, 2317-2322. Results are stored as a part of the DC descriptor, 2323. The full size of a particular area cannot be determined from a small sample set so the information regions are automatically adjusted as more samples are added to the Sample Collection.

Extracted information and the associated format data is saved in a list or a database and retained according to configuration rules based on application and/or legal parameters. This information is often used to cross-check MRD, log the event, to query "watch Lists," check for "rights and privileges" or to confirm it with the issuer.

Identification and Validation Phase

Figure 24:
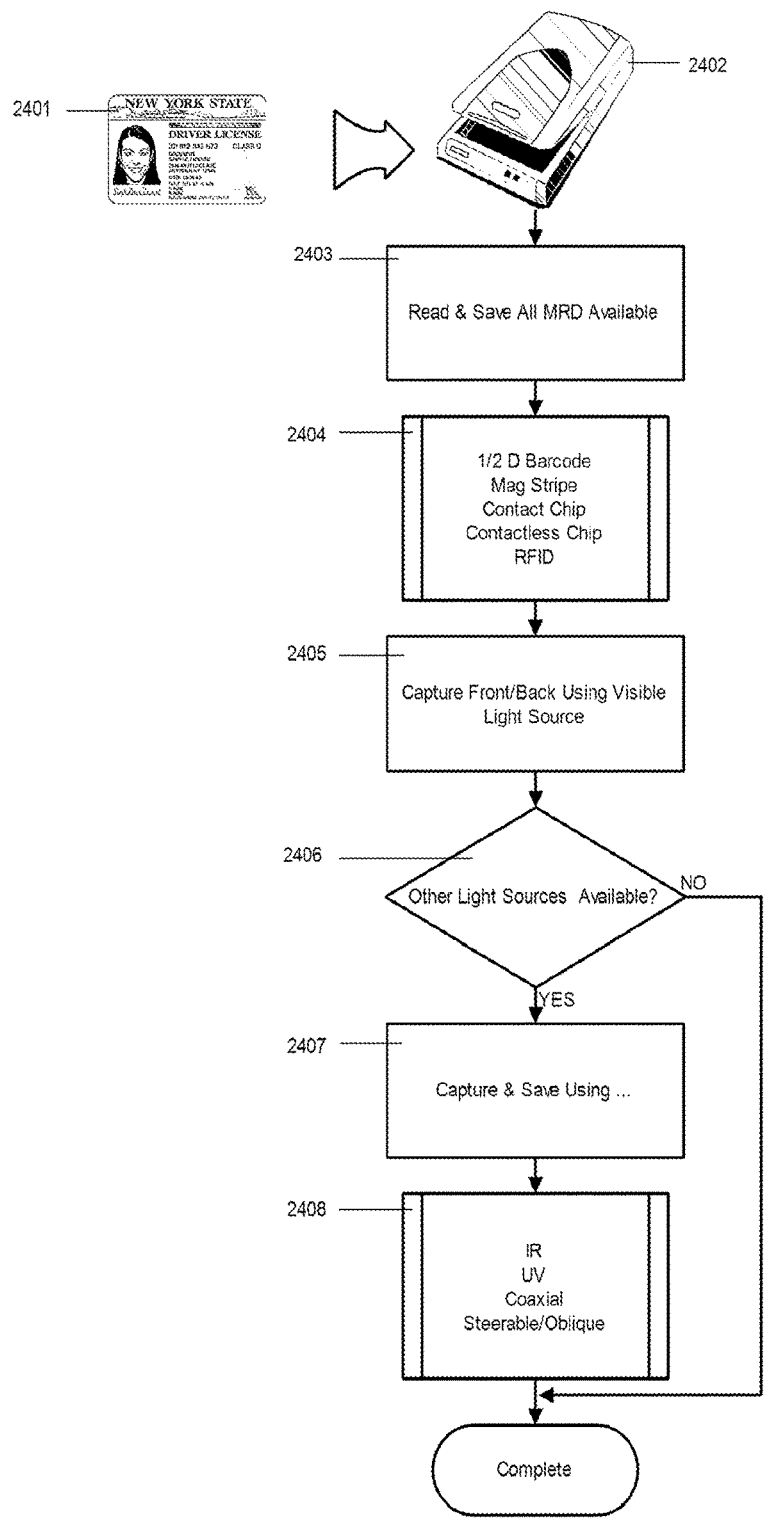
FIG. 24 provides a view of details for image data acquisition.
Figure 25A:
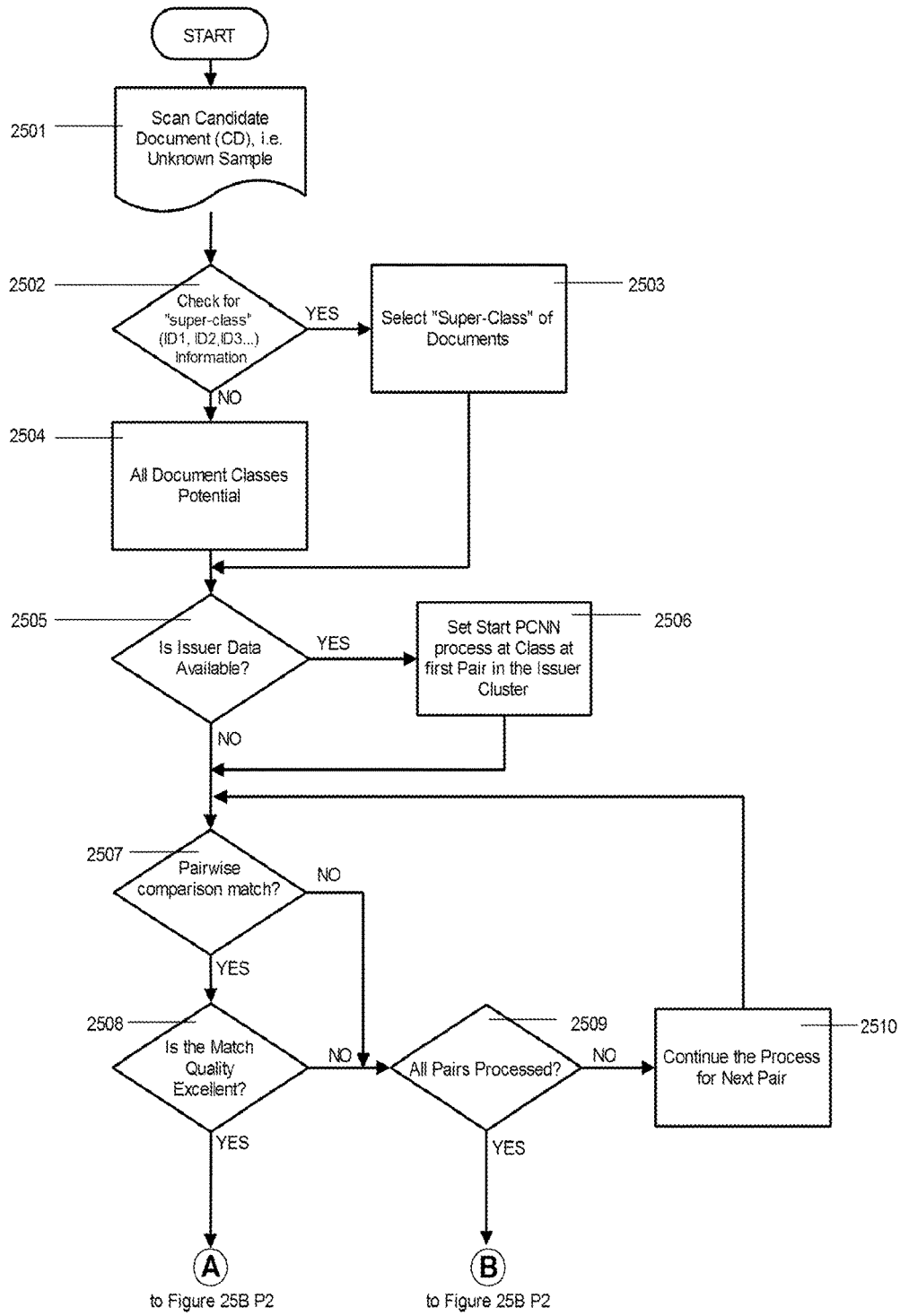
FIG. 25A provides a view of a first steps in the classification method.
Figure 25B:
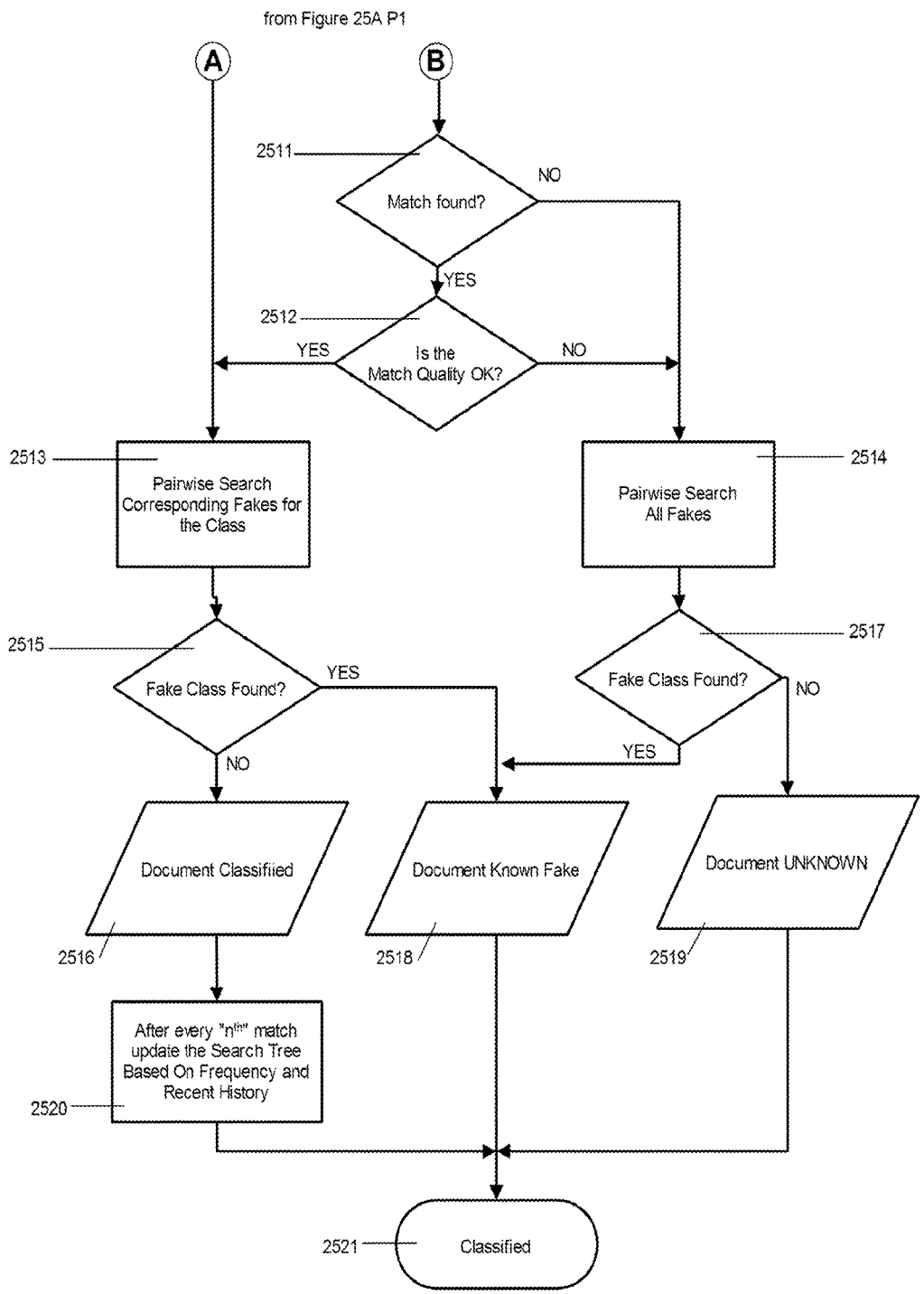
FIG. 25B provides a view of a final stages in the classification method.
Figure 27:
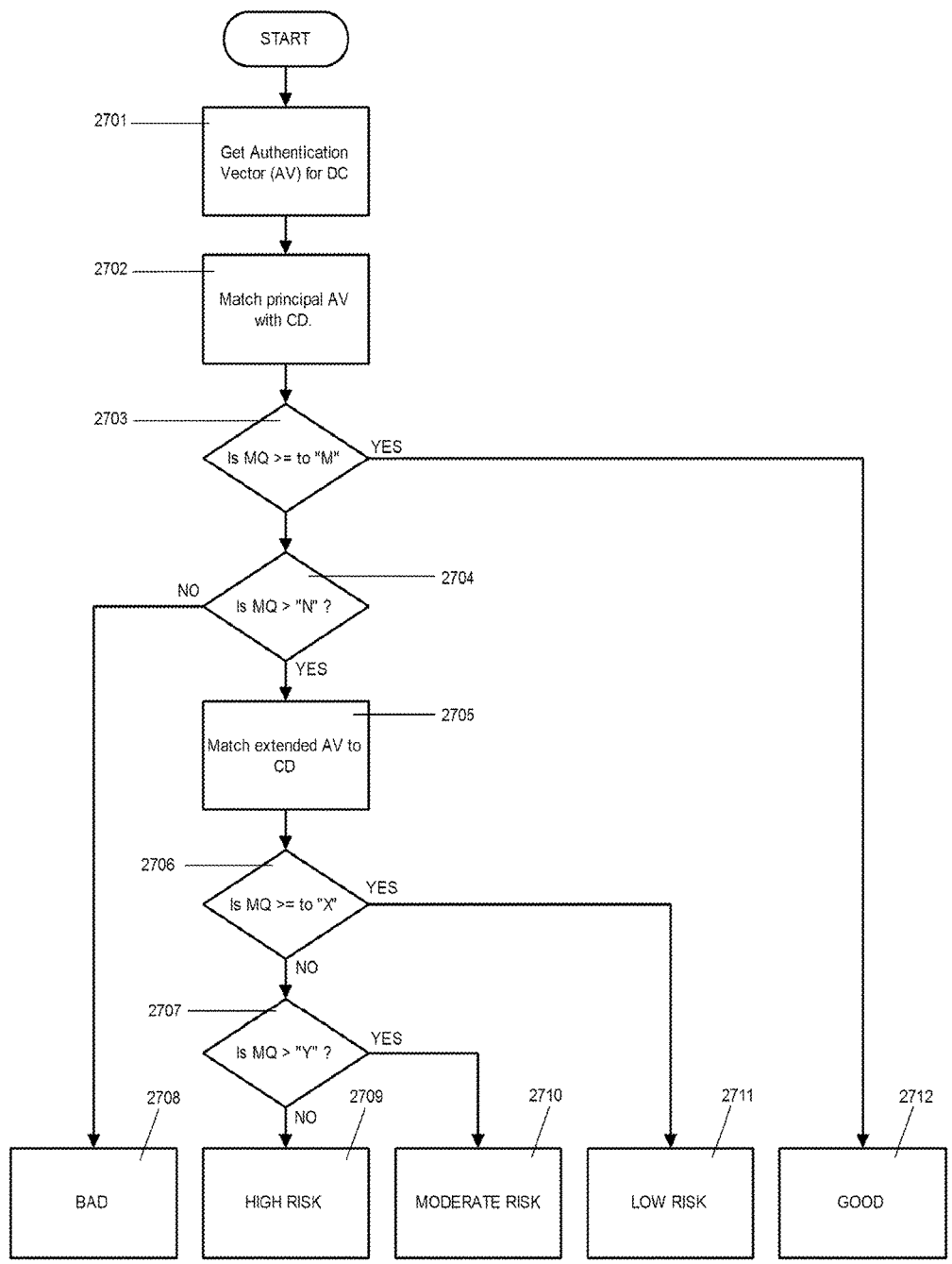
FIG. 27 provides a view of process steps for authenticating the candidate document.
Figure 29:
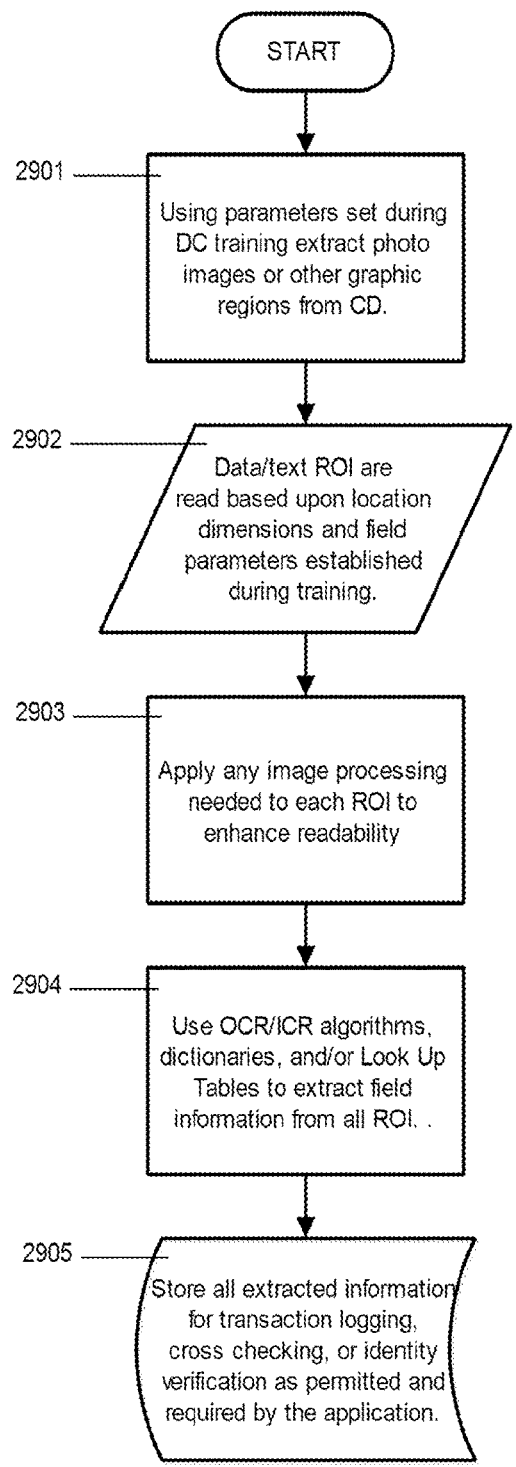
FIG. 29 provides a view of a process for data extraction from the candidate document image.

A typical analysis (FIG. 6) of an identification document consists of the following steps: data acquisition (FIG. 24), classification (FIG. 25), authentication (FIG. 27), and data extraction (FIG. 29) as shown previously. First, images and any MRD available must be acquired from the CD. Then the CD must be classified from this information as being typical of a particular class of document. Once classified the CD must be examined to determine if the document is a genuine exemplar of that class and not a forgery. Finally, any data information (e.g. name, address, ID number, etc.) is extracted from the document.

Image & Data Acquisition Process

The image and data acquisition process (FIG. 24) starts when a Candidate Document (CD) is presented by the bearer, 2401 and scanned or imaged in some manner, 2402 to produce a set of images that represent the CD. The sensors to obtain the image typically may consist of either a camera or contact image sensor. These may be embedded in a scanner device of some sort which allows the ID to be placed in a certain fixed location where pictures will be taken under various lighting conditions (camera) or where a contact sensor is moved across the document. Alternatively, the document could be placed in a scanner device which physically moves the document or ID across a sensor or in front of a camera to extract the images.

Some scanners will capture a bounded image containing just the relevant area of the document. Others may initially capture a larger image area than the document itself. In such cases, image processing steps may be used to de-skew, transform, and crop the image set into one containing just the document image(s) alone. See FIG. 8. These image processing steps are crucial if the Data Acquisition comes from a free-form situation where a camera is the imaging sensor and the document is at a set location and orientation relative to the CD.

In addition, the scanner may have capabilities of collecting data from the document by other than strictly imaging means, 2403. For instance, a magnetic stripe head may collect a data stream from the magnetic stripe which may be present on some forms of ID. Likewise, some IDs may contain "smart" chips or RFID chips which contain information which might be read. Some scanners may incorporate a separate barcode scanner which may rely on means different than analyzing the scanned image, 2404.

The image set may include front and back images of the ID and in some cases even edges, 2405. In the case of a passport, the set might include a number of separate pages. The images may be gathered with sensors that provide a color or perhaps only grayscale representation (for the visible spectrum). The images may be gathered in different lighting conditions, such as visible, infrared, ultraviolet, or other spectra, 2406-2408. An important property of the images will be their spatial resolution (typically expressed in units such as dots per inch) where a higher value allows for inspection of finer detail.

Classification Method

In the case of IDs, there is a tremendous variety in circulation at any given time. IDs come in different sizes (e.g. ID-1 which are driver's license sized, and ID-3 which are passport page sized as defined by ICAO Specification 9303). There are a variety of issuers (countries, states, and even municipalities). A given issuer provides a number of different categories of IDs. A state may issue driver's licenses, identification cards, learner permits, and firearms licenses, while governments may issue passports, visas, alien cards, etc. At any given point in time, there will be multiple generations of IDs in circulation. There are over 2000 types of official IDs in general circulation including both domestic and international issuers. The overall Classification process is defined in detail in FIGS. 25A-25B.

A CD is typically expected to be a member of a finite variety of known Document Classes (e.g. an ID variety from a particular state). The classification problem in this case is to determine the exact type of document that has been presented. In order to reduce the number of DCs to be examined, the first step is to scan the CD, 2501, and check the document size, 2502-2504. If MRD is available, the fastest preliminary classification approach is to check if there is data on the issuer (e.g. New York), subtype (e.g. Driver's License), and/or by its series (e.g. 2013, year of first issue) data. If MRD is available, the PCNN will start with the first node for that issuer, otherwise the PCNN process is immediately started at the first node in the predefined Class Order, 2505-2506.

When a comparison match is made to a class, 2507, the Match Quality (MQ) is tested to determine if the PCNN can skip the remainder of the network, 2508. If there is no match or the match quality is not exact then pairwise comparisons continue, 2509, 2510. If a non-exact match is found then the MQ is tested to be sure it exceeds the minimum level, 2511,

2512. If it does or there was an exact match, then it is tested to see if there is a match to any known fake in the corresponding Fake Class, 2513, 2515, 2516, 2518. If there is no match found above an acceptable level then the CD is compared against all known fakes, 2514, 2517, and 2518. If a matching fake is not found then it is classified as UNKNOWN, 2519. Every $N^{th}$ document classified triggers an update, 2520, to the corresponding DCs or FCs based on the features for the CD documents classified since the last update. The result is a classification as a known document, a known fake, or an UNKNOWN document, 2521.

Pairwise matching at the PCNN nodes uses the inter-class FVs determined for each DC pair during the Training Phase. The PCNN process flow is described in principle in the BACKGROUND section and FIGS. 1-4. The PCNN classification method is detailed in FIGS. 26A, 26B, 26C. DC pairs are compared in accordance with the Class order established during training and adaptively modified as documents are classified at a given location. See FIG. 26A.

The process starts with the presentation of the CD, 2601. Each node in the PCNN compares two potential DCs in the order that offers the greatest probability of a match to the CD, as determined by the class ordering method. The matching method used at nodes within the classification PCNN is intelligent. Instead of a simple comparison between pairs using the same features for each one, the PCNN uses the IFV derived during the Training Phase to provide maximum differentiation. In addition, beyond the pairwise "voting" approach for comparing objects, it adapts the match threshold according to the statistics of the feature in both classes. This adaptive threshold method minimizes the ambiguity that otherwise might occur when the CD feature value is close to the mathematical center between the average measured value for each class. A threshold simply centered between feature values may, in fact, more closely match one document over the other due to the anticipated variance. The third difference is a Test for Match Quality (TMQ) that looks at how well the CD compares to the DC chosen as the best match in the pairwise comparison (see FIG. 26B). If the quality of the match is very high, 2603, then there is a strong possibility that this is the CD class. If so, then a detailed comparison to the DC is warranted to confirm the possibility and bypass the remainder of the classification PCNN and go directly to the check for any chance of a match to a known Fake Class (FC). This is done by matching the first "x" nodes of the DC FV to the equivalent features in the CD. If there is not a high-quality match to this DC, then the test is not repeated for that DC, i.e. TMQ is only done the first time a match occurs to a particular DC.

Figures 26A, 26B:
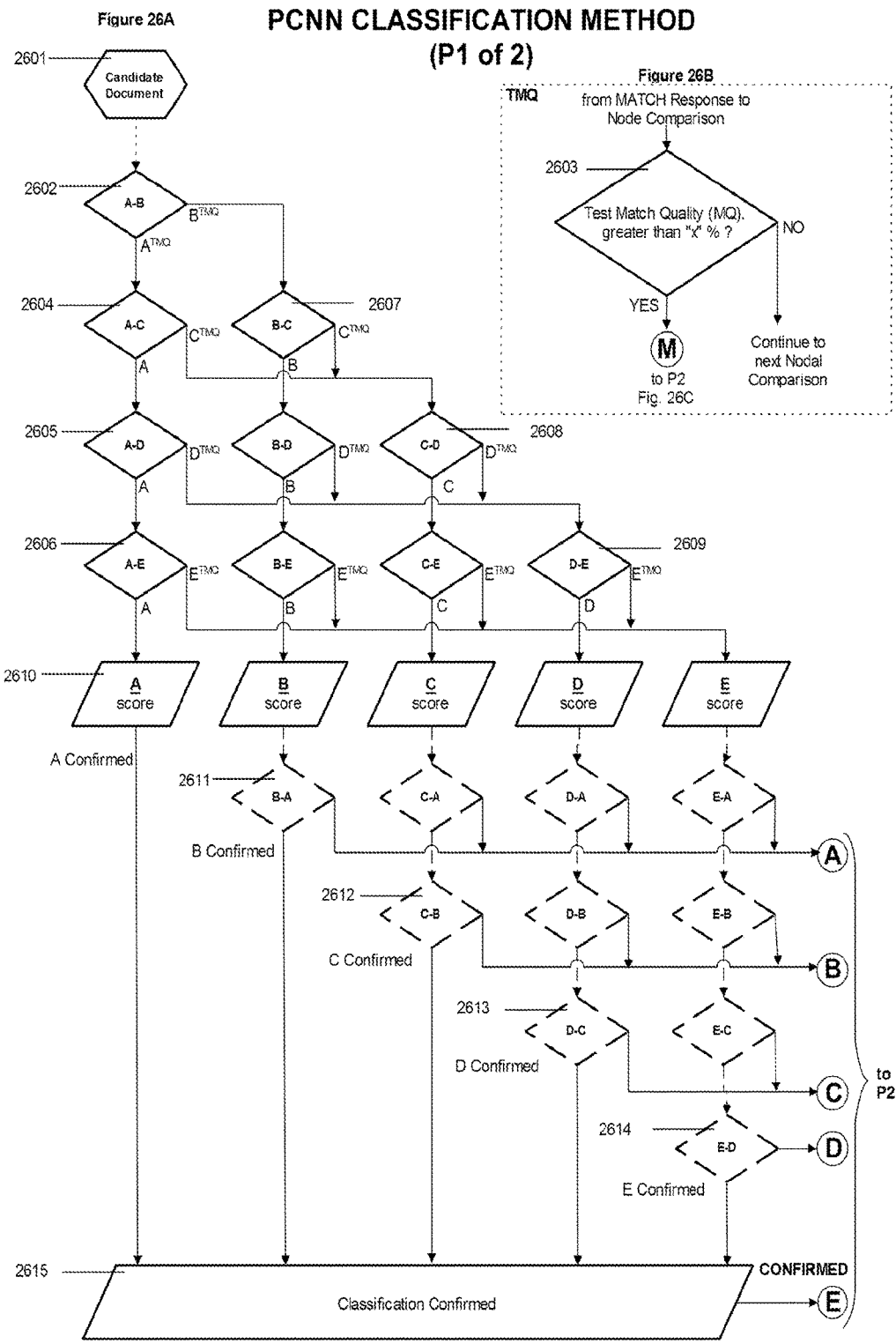
FIG. 26A provides a view of a core classification PCNN process flow.
FIG. 26B provides a view of a test for match quality sub-process.

The PCNN structure is illustrated in FIG. 26A using a universe of 6 DCs (Classes A-E). A best match of A-B, 2602 to the first DC in pair order (A), 2602 results in navigation to the next lower vertical pair (A-C), 2604 (compares the same DC to the next DC in order) and the converse (B best) results in lateral navigation to the next column to repeat the process using the second DC in the match (B) as the new primary DC to continue the process flow with a B-C match, 2607 and so on.

Once a set of comparisons has been completed for a DC, 2605, 2606, 2608, 2609 against all others the DC a "best match to class" decision is made, 2610. If the CD has been tested against all classes, it is said to be CONFIRMED, 2615. To ensure that all possible match combinations have been tested, then a selected DC is matched against all classes that were skipped during the process, 2611-2614. Because the "best match" to a class leaves open the possibility that the CD is a fake or unknown document, see FIG. 26C, the potential DC FV is matched against the CD, 2616. This is not necessary if the DC was arrived at after passing a TMQ since that would be redundant. If the comparison does not meet a minimum requirement, then the document is UNKNOWN or a FAKE. The CD is then subjected to a FC PCNN, 2619 to determine if it is a known fake that is so poor quality it will not classify as a DC, 2620 or if it is truly unknown, 2621.

If a CD is above the minimum quality for a match to the "best match" DC, then it is presumed to be an altered or damaged document or a "good fake." Note: that a TMQ would have identified a very good match to the DC before the PCNN selection route was completed. Often very good fakes of a DC have subtle "tells" or patterns of small variations from the DC FV. Therefore, as an added classification/authentication step for all positive DC matches, the CD is further tested against all known fakes for that class, 2617. If there is no match to a known fake for the class, then the CD classified as a specific DC and a "risk" score is assigned, else it is classified as a known fake for the class.

Authentication Method

Authentication is the process of determining whether the document presented is a genuine exemplar of that particular Document Class (i.e. Validity), belongs to the bearer, and that bearer is currently entitled to the rights represented by the DC. Because documents are subject to manufacturing variations, wear, and damage, it is not sufficient to simply make a series of measurements and flag the CD as fake or altered based on a poor feature match. High-quality fakes will be in general conformance with a majority of the features that are measured. Quality authentication requires precise examination of "difficult to duplicate" or hidden features. This involves looking for minute differences between a CD and what is present on a real document of the same type (although the information, e.g. name, may be different). The result of this step is a determination as to whether the document is Valid or a Fake (or perhaps Modified). The result is reported in a numerical manner on a scale where one end of the scale indicates a low risk and the other end of the scale represents a high risk that the document is not authentic or has been altered. In many applications a threshold comparison is made and only a "GOOD" or "BAD" decision is given to the document examiner.

Once classified the MQ thresholds and the AV computed during the Training Phase and data extracted from the CD are used to make this determination. These are two aspects of the Authentication Process. See FIG. 27. One matches the AV image features that were trained such as:
  Color/Grayscale Response—color tests
  Physical Relationship between card elements
  Pattern Matching
  Presence/Absence (for all light sources)
  Security Feature Verification (holograms patterns)
  Statistical Properties The second aspect validates the data associated with the CD using tests such as:
  MRZ Tests—check digits, field format
  Cross Matching information from different locations
    OCR, Barcode, Magnetic Stripe, RFID
    Date Checking—Birth Date, Expiration, Issue Date
    Comparison with Issuer DB; Watch Lists; Control Authorities The authentication process relies on the AV for the DC, 2701 and matches it against the corresponding properties extracted from the CD, 2702. The first match is against the properties which represent the "principal" AV. The principal AV consists of the highest ranked properties in the vector. If the Match Quality (MQ) is excellent, then the document is deemed to be GOOD, 2703, 2712. If the MQ is less than this threshold, then it is tested to see if it is above a minimum threshold, 2704. If it is below this threshold, the CD is rated as BAD, 2708. If it is equal or above the threshold, then the "extended" AV which has the next highest ranked set of properties is used for further examination, 2705. If the MQ for the extended AV, 2706 is very good, then the CD is deemed to be of LOW RISK, 2711. If it is not, then it is tested to see if the MQ is above a minimum threshold, 2707. If it is above this threshold, the CD is rated as MODERATE RISK, 2710. If the MQ is below then the CD is rated as HIGH RISK, 2709. The automatic calculation of these MQ thresholds is based on statistical analysis during the training process and is a critical teaching of this invention.

Figure 28:
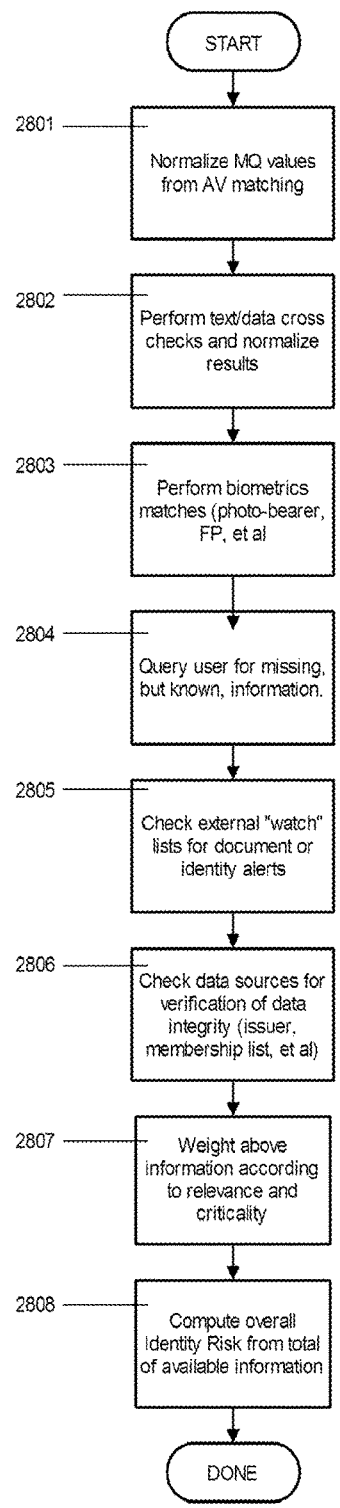
FIG. 28 provides a view of steps in risk factor calculation.

The authentication of the CD is a critical step in calculation of a net Risk Factor (See FIG. 28) for Identity Verification, 2801, 2802. However, there are still issues of potential revocation, "look alike" bearer, 2803, 2804, or reasons why a real identity with authentic document should not be granted the rights or privileges being sought, 2805, 2806. This invention provides a risk factor for the CD and a method for extraction of biometric, biographic, and index information for the complete assessment of the identity profile. The number of elements in a document (image) and its contents (data, biometrics: photo, fingerprint, iris template, etc.) that are examined, are factors in assessing the risk factor that a document is fraudulent or being used fraudulently. Another factor is the detail precision to which each element is examined. The third factor is the number of independent sources that can be checked to verify the document and its bearer. All the desirable information may not be available due to time or access restrictions; however, all available information can be normalized and statistically evaluated to provide a factor that quantizes the risk associated with the bearer of the CD and the granting of rights or privileges, such as access, financial transaction, or a restricted purchase, 2807, 2808.

Data Extraction Method

If the CD is Valid, the remaining step for identity verification is to determine if the bearer of the CD is the one to whom it was issued. This is typically done through a biometric comparison or a knowledge test to screen if the bearer has information that is expected to be had by the person that was issued the ID document. In instances where an embedded photo comparison to the bearer or where other biometric information contained by the CD is the biometric link, then Data Extraction is very important. Also data, data consistency, and transaction logging are needed for many applications. In some instances (i.e. intelligence gathering) it is as, or more critical, than the authenticity of the document.

Data extraction is the process of reading any data that is embedded on an ID. See FIG. 29, Data Extraction Method. There are a number of possible sources of such data. Non-encoded text data is printed on the ID and can be read by traditional Optical Character Recognition (OCR) methods. Some IDs have Machine Readable Data (MRD) including: magnetic stripes which require a magnetic head in the scanner to extract the data; 1D or 2D barcodes which can be decoded either from the image or by scanning with a laser based scan head; more recently, e-Passports and "smart" cards with electronic chips; and cards with RFID chips, such as the Enhanced Driver's License (EDL), which also requires special reading capability.

During the Training Phase, areas with a large degree of variability amongst samples were identified automatically, or in a semi-automatic method with an operator tagging the areas where photos, signature, name, address, and other variable information are located for a given DC. These areas are extracted from the CD after classification. Photo, signature, graphic, 2901 and text/data, 2902, information are extracted using simple image processing steps, 2903, and/or OCR/ICR and barcode-from-image processing, 2904. This information is stored, 2905, for use by user applications and may be used for authentication or tests for document alterations by comparing like information from different locations on the document or an external source, such as the issuer's database.

What is claimed is:

1. A computerized method for classifying and authenticating an item capable of authentication using a pairwise comparison nodal network comprising the steps of:
obtaining an electronic representation by scanning of a candidate item capable of authentication using a computerized input device into at least one computer;
selecting, by the at least one computer, a predetermined plurality of regions of the scanned candidate item;
recording, by the at least one computer, measurements of the candidate item, wherein the candidate item comprises at least one measurement for each of the plurality of regions;
classifying the candidate item as one of a plurality of item classes using a pairwise comparison nodal network of the at least one computer, the pairwise comparison nodal network having a first node comprising a plurality of measurements that best distinguish between a first item class and a second item class, a second node comprising a plurality of measurements that best distinguish between a first item class and a third item class, and a third node comprising a plurality of measurements that best distinguish between a second item class and a third item class, the classifying being performed in a pairwise comparison fashion by classification analyzing steps, comprising:
analyzing the measurements of the candidate item at the first node by the at least one computer, the analyzing resulting in a computerized selection that the candidate item better corresponds to either the first item class or the second item class;
wherein if the computerized selection corresponds to the first item class, analyzing the measurements of the candidate item at the second node, resulting in a computerized selection that the candidate item better corresponds to either the first item class or the third item class, or wherein if the computerized selection corresponds to the second item class, analyzing the measurements of the candidate item at the third node, resulting in a computerized selection that the candidate item better corresponds to either the second item class or the third item class, wherein the analysis of the first node and one of the second or the third node results in a classification of the candidate item; and
authenticating, by the at least one computer, the classified candidate item after the classification analyzing steps.

2. The method of claim 1 wherein the candidate item is an identification document.

3. The method of claim 1 wherein the first item class and second item class of the first node are selected to be the most and second most likely item to be scanned.

4. The method of claim 1 wherein the first item class and second item class of the first node are selected to be the most and second most geographically proximate State issued identification documents.

5. The method of claim 1 wherein the authenticating step comprises performing optical character recognition of identification information on the item by the at least one computer.

6. The method of claim 1 further comprising a fourth node comprising a plurality of measurements that best distinguish between the first class of items and a class of known fake items, and further comprising the step of analyzing, by the at least one computer, the fourth node, resulting in a computerized selection that the candidate item corresponds to the first item class or the class of known fake items.

7. The method of claim 1 wherein the at least one measurement taken by the at least one computer are measurements of at least one of color, shape identification, luminance, statistical properties, line content, brightness, shading, and spectral measurements.

8. The method of claim 1 wherein the at least one computer is a mobile wireless computing device, and wherein the computerized input is a camera.

9. The method of claim 8 further comprising the step of determining, by the at least one computer, if a classification confidence based on the classifying step is above a predetermined level, the classification confidence being calculated based on a plurality of validation parameters; and
determining, based on the classification confidence, that the document is real if the classification is above the predetermined level, or that the document is one of real but poor quality, damaged, forged, altered, a document subclass, and an unknown document if the classification confidence is below a predetermined level.

10. The method of claim 1 further comprising the step of calculating, based on the classifying and authenticating steps by the at least one computer, a confidence of validity, and comprising the step of displaying the confidence of validity on a display of the at least one computer.

11. A computerized method for classifying and authenticating a document using a pairwise comparison nodal network comprising the steps of:
obtaining an electronic representation by scanning of a candidate document using a computerized input device into at least one computer;
selecting, by the at least one computer, a predetermined plurality of regions of the scanned candidate document;
recording, by the at least one computer, measurements of the candidate item, wherein the candidate item comprises at least one measurement for each of the plurality of regions wherein the at least one measurement taken by the at least one computer are at least one of color, shape identification, luminance, line content, brightness, shading, and ultraviolet measurements;
classifying the candidate document as one of a first plurality of document classes using a pairwise comparison nodal network of the at least one computer, the pairwise comparison nodal network having a first node comprising a plurality of measurements that best distinguish between a first document class and a second document class wherein the first document class and second document class of the first node are selected to be the most and second most likely documents to be scanned, a second node comprising a plurality of measurements that best distinguish between a first document class and a third document class, and a third node comprising a plurality of measurements that best distinguish between a second document class and a third document class, the classifying being performed in a pairwise comparison fashion by classification analyzing, comprising:
analyzing the measurements of the candidate document at the first node by the at least one computer, the analyzing resulting in a computerized selection that the candidate document better corresponds to either the first document class or the second document class;
wherein if the computerized selection corresponds to the first document class, analyzing the measurements of the candidate document at the second node, resulting in a computerized selection that the candidate document better corresponds to either the first document class or the third document class, or wherein if the computerized selection corresponds to the second document class, analyzing the measurements of the candidate document at the third node, resulting in a computerized selection that the candidate document better corresponds to either the second document class or the third document class, wherein the analysis of the first node and one of the second or the third node results in a preliminary classification of the candidate document;
classifying the candidate document as one of a second plurality of document classes, wherein the second plurality of document classes are identification documents, the second plurality of document classes being a subclass of the one of the first plurality of document classes, the classifying comprising using a second pairwise comparison nodal network having a plurality of nodes, each node corresponding to a plurality of measurements that best distinguish between two of the second plurality of document classes, wherein the analysis by the second pairwise comparison nodal network results in a classification of the preliminarily classified document;
authenticating, by the at least one computer, the classified candidate document after the classification analyzing; and
calculating, based on the classifying and authenticating steps by the at least one computer, a confidence of validity, and comprising the step of displaying the confidence of validity on a display of the at least one computer.

12. The method of claim 11 wherein the at least one computer is a mobile wireless computing device, and wherein the computerized input is a camera.

13. The method of claim 11 further comprising the step of determining, by the at least one computer, if a classification confidence based on the classifying step is above a predetermined level, the classification confidence being calculated based on a plurality of validation parameters; and
determining, based on the classification confidence, that the document is real if the classification is above the predetermined level, or that the document is one of real but poor quality, damaged, forged, altered, a document subclass, and an unknown document if the classification confidence is below a predetermined level.

* * * * *

UNITED STATES PATENT AND TRADEMARK OFFICE
CERTIFICATE OF CORRECTION

PATENT NO. : 10,354,472 B2
APPLICATION NO. : 15/319441
DATED : July 16, 2019
INVENTOR(S) : Kuklinski et al.

Page 1 of 1

It is certified that error appears in the above-identified patent and that said Letters Patent is hereby corrected as shown below:

In the Claims

Claim 7, Column 33, Lines 17-18, please delete "computer are measurements of" and insert --computer is a measurement of--;

Claim 9, Column 33, Line 34, please delete "below a predetermined" and insert --below the predetermined--;

Claim 13, Column 34, Line 62, please delete "below a predetermined" and insert --below the predetermined--.

Signed and Sealed this
Twenty-second Day of October, 2019

Andrei Iancu
*Director of the United States Patent and Trademark Office*